(12) United States Patent
Basu Mallick et al.

(10) Patent No.: US 10,462,679 B2
(45) Date of Patent: Oct. 29, 2019

(54) COVERAGE ENHANCEMENT LEVEL SIGNALING AND EFFICIENT PACKING OF MTC SYSTEM INFORMATION

(71) Applicant: Panasonic Intellectual Property Corporation of America, Torrance, CA (US)

(72) Inventors: Prateek Basu Mallick, Hessen (DE); Hidetoshi Suzuki, Kanagawa (JP); Joachim Loehr, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 167 days.

(21) Appl. No.: 15/647,117

(22) Filed: Jul. 11, 2017

(65) Prior Publication Data
US 2017/0318478 A1 Nov. 2, 2017

Related U.S. Application Data

(63) Continuation of application No. PCT/JP2016/001729, filed on Mar. 25, 2016.

(30) Foreign Application Priority Data

Apr. 17, 2015 (EP) .................................... 15164127

(51) Int. Cl.
*H04W 16/26* (2009.01)
*H04W 4/70* (2018.01)
(Continued)

(52) U.S. Cl.
CPC ........... *H04W 16/26* (2013.01); *H04L 5/0069* (2013.01); *H04L 5/0091* (2013.01); *H04W 4/70* (2018.02); *H04W 48/12* (2013.01); *H04L 5/0023* (2013.01)

(58) Field of Classification Search
CPC ....... H04W 4/70; H04W 48/12; H04W 16/26; H04W 16/00; H04W 16/24; H04L 5/0091; H04L 5/0069; H04L 5/0023
(Continued)

(56) References Cited

U.S. PATENT DOCUMENTS

2015/0271686 A1* 9/2015 Jha ........................ H04W 24/02
370/329
2016/0242206 A1* 8/2016 Ohlsson ............ H04W 72/1231
(Continued)

OTHER PUBLICATIONS

International Search Report of PCT application No. PCT/JP2016/001729 dated Jun. 14, 2016.
(Continued)

*Primary Examiner* — Rownak Islam
(74) *Attorney, Agent, or Firm* — Seed IP Law Group LLP

(57) ABSTRACT

The present disclosure relates to transmitting and receiving of system information which includes controlling the transmission and/or the reception to transmit and/or receive system information including a coverage enhancement level indication for indicating enhanced coverage levels supported by the wireless communication system and to transmit and/or receive system information including a group of information elements common for different coverage enhancement levels and information elements specific for different coverage enhancement levels grouped for respective coverage enhancement levels.

10 Claims, 10 Drawing Sheets

(51) Int. Cl.
 *H04W 48/12* (2009.01)
 *H04L 5/00* (2006.01)
(58) Field of Classification Search
 USPC .......................................................... 370/328
 See application file for complete search history.

(56) References Cited

U.S. PATENT DOCUMENTS

2017/0238302 A1* 8/2017 Futaki ................. H04W 72/048
 370/329
2017/0339667 A1* 11/2017 Shen ..................... H04W 68/00
2018/0070403 A1* 3/2018 Uemura ................. H04W 4/70

OTHER PUBLICATIONS

3GPP TS 36.211, V8.9.0, "Evolved Universal Terrestrial Radio Access (E-UTRA); Physical Channels and Modulation (Release 8)", Dec. 2009.

3GPP TS 36.212, V12.4.0, "Evolved Universal Terrestrial Radio Access (E-UTRA); Multiplexing and channel coding (Release 12)", Mar. 26, 2015.

"The UMTS Long Term Evolution—From Theory to Practice", Edited by Stefanie Sesia, Issam Toufik, Matthew Baker, Chapter 9.3, Jul. 2011 pp. 196-214.

3GPP TS 36.321, V12.5.0, "Evolved Universal Terrestrial Radio Access (E-UTRA); Medium Access Control (MAC) protocol specification (Release12)", Mar. 2015.

3GPP TS 36.331, V12.5.0, "Evolved Universal Terrestrial Radio Access (E-UTRA); Radio Resource Control (RRC); Protocol specification (Release12)", Mar. 2015.

3GPP TSG RAN Meeting #67, RP-150492, Ericsson, "Revised WI: Further LTE Physical Layer Enhancements for MTC", Mar. 2015.

3GPP TSG RAN WG1#66bis, R1-112912, Huawei, HiSilicon, CMCC: "Overview on low-cost MTC UEs based on LTE", Oct. 3, 2011.

3GPP TR 36.888, V12.0.0, "Study on provision of low-cost Machine-Type Communications (MTC) User Equipments (UEs) based on LTE (Relese 12)", Jun. 2013.

3GPP TSG RAN Meeting #66, RP-141865, "Revised WI: Further LTE Physical Layer Enhancements for MTC", Dec. 2, 2014.

* cited by examiner

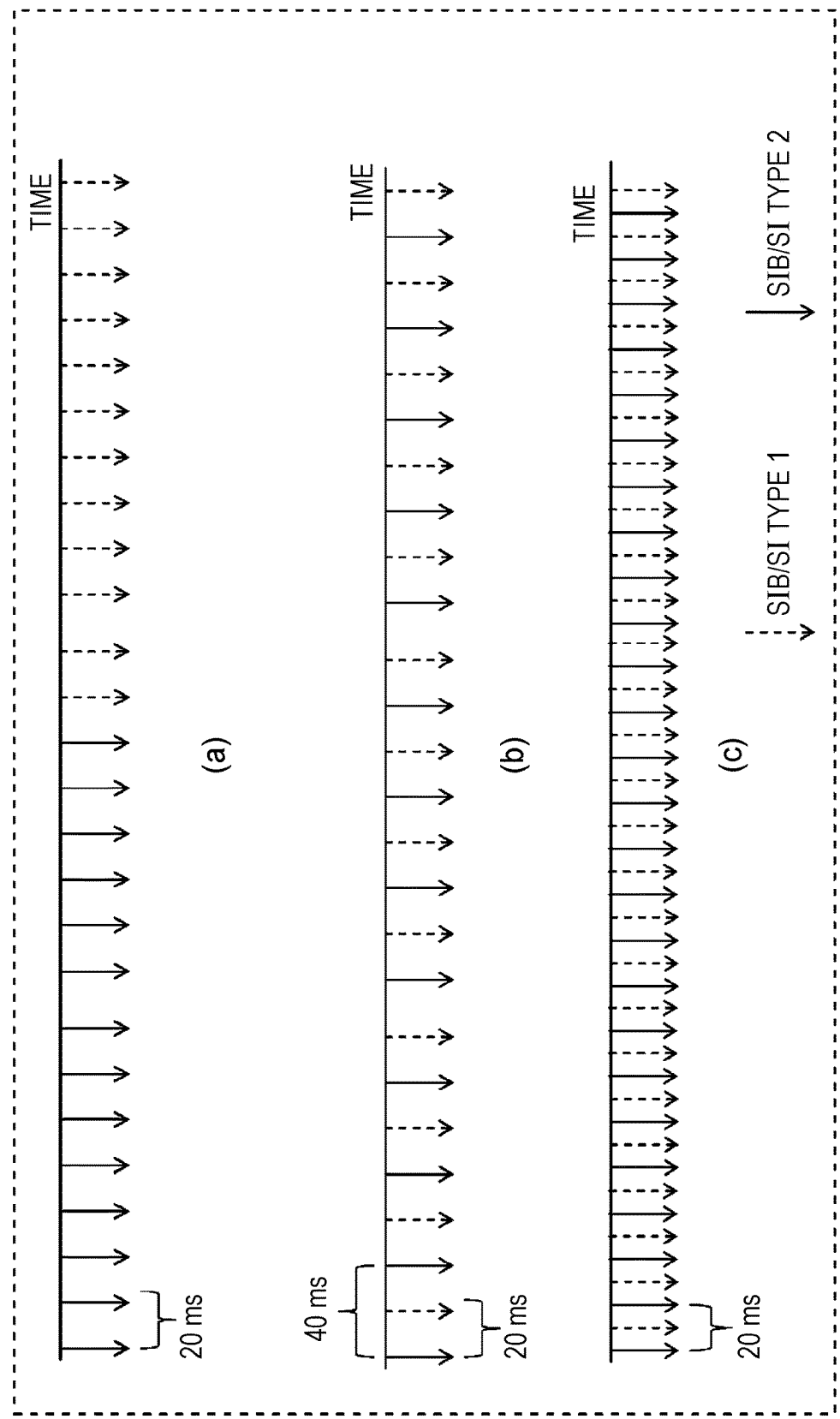

COVERAGE ENHANCEMENT LEVEL SIGNALING AND EFFICIENT PACKING OF MTC SYSTEM INFORMATION

BACKGROUND

1. Technical Field

The present disclosure relates to transmission and reception of system information in a wireless communication system.

2. Description of the Related Art

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE).

The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

FIG. 3 shows a radio frame structure for LTE FDD. The downlink component carrier of a 3GPP LTE (Release 8 and further) is subdivided in the time-frequency domain in radio frames, which are further subdivided into so-called subframes. In 3GPP LTE (Release 8 and further) each subframe is divided into two downlink slots, one of which is shown in FIG. 4. The first downlink slot includes the control channel region (PDCCH region) within the first OFDM symbols. Each subframe consists of a given number of OFDM symbols in the time domain (12 or 14 OFDM symbols in 3GPP LTE, Release 8 and further), wherein each OFDM symbol spans over the entire bandwidth of the component carrier. The OFDM symbols thus each consists of a number of modulation symbols transmitted on respective $N^{DL}_{RB} * N^{RB}_{SC}$ subcarriers. Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as $N^{DL}_{symb}$ consecutive OFDM symbols in the time domain (e.g. 7 OFDM symbols) and $N^{RB}_{SC}$ consecutive subcarriers in the frequency domain as exemplified in FIG. 4 (e.g. 12 subcarriers for a component carrier). In 3GPP LTE (Release 8), a physical resource block thus consists of $N^{DL}_{symb}*N^{RB}_{SC}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N^{RB}_{SC}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Downlink control information occurs in several formats that differ in overall size and also in the information contained in its fields. The different DCI formats that are currently defined for LTE are as follows and described in detail in 3GPP TS 36.212, "Multiplexing and channel coding", version 12.4.0, section 5.3.3.1 (available at http://www.3gpp.org and incorporated herein by reference). For further information regarding the DCI formats and the particular information that is transmitted in the DCI, please refer to the technical standard or to LTE—The UMTS Long Term Evolution—From Theory to Practice, Edited by Stefanie Sesia, Issam Toufik, Matthew Baker, Chapter 9.3, incorporated herein by reference.

In order that the UE can identify whether it has received a PDCCH transmission correctly, error detection is provided by means of a 16-bit CRC appended to each PDCCH (i.e. DCI). Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", incorporated hereby by reference. The section describes how error detection is provided on DCI transmissions through a Cyclic Redundancy Check (CRC). A brief summary is given below. The entire payload is used to calculate the CRC parity bits. The parity bits are computed and attached. In the case where UE transmit antenna selection is not configured or applicable, after attachment, the CRC parity bits are scrambled with the corresponding RNTI.

The scrambling may further depend on the UE transmit antenna selection, as apparent from TS 36.212. In the case where UE transmit antenna selection is configured and applicable, after attachment, the CRC parity bits are scrambled with an antenna selection mask and the corresponding RNTI. As in both cases the RNTI is involved in the scrambling operation, for simplicity and without loss of generality the following description of the embodiments simply refers to the CRC being scrambled (and descrambled, as applicable) with an RNTI, which should therefore be understood as notwithstanding e.g. a further element in the scrambling process such as an antenna selection mask.

Correspondingly, the UE descrambles the CRC by applying the "UE identity" and, if no CRC error is detected, the UE determines that PDCCH carries its control information intended for itself. The terminology of "masking" and "de-masking" is used as well, for the above-described process of scrambling a CRC with an identity.

The "UE identity" mentioned above with which the CRC of the DCI may be scrambled can also be a SI-RNTI (System Information Radio Network Temporary Identifier), which is not a "UE identity" as such, but rather an identifier associated with the type of information that is indicated and transmitted, in this case the system information. The SI-RNTI is usually fixed in the specification and thus known as priority to all UEs.

There are various types of RNTIs that are used for different purposes. The following table taken from 3GPP 36.321, "Evolved Universal Terrestrial Radio Access (E-UTRA); Medium Access Control (MAC) protocol specification", version 12.5.0, Chapter 7.1 shall give an overview of the various 16-bits RNTIs and their usages.

Table 1

| Value (hexa-decimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Schduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

Physical Downlink Control Channel (PDCCH) and Physical Downlink Shared Channel (PDSCH)

The physical downlink control channel (PDCCH) carries e.g. scheduling grants for allocating resources for downlink or uplink data transmission. Multiple PDCCHs can be transmitted in a subframe.

The PDCCH for the user equipments is transmitted on the first $N^{PDCCH}_{symb}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N^{PDCCH}_{symb}$ OFDM symbols in the time domain and the $N^{DL}_{RB}*N^{RB}_{SC}$ subcarriers in the frequency domain is also referred to as PDCCH region or control channel region. The remaining $N^{PDSCH}_{symb}=2*N^{DL}_{symb}-N^{PDCCH}_{symb}$ OFDM symbols in the time domain on the $N^{DL}_{RB}*N^{RB}_{SC}$ subcarriers in the frequency domain is referred to as the PDSCH region or shared channel region (see below).

For a downlink grant (i.e. resource assignment) on the physical downlink shared channel (PDSCH), the PDCCH assigns a PDSCH resource for (user) data within the same subframe. The PDCCH control channel region within a subframe consists of a set of CCE where the total number of CCEs in the control region of subframe is distributed throughout time and frequency control resource. Multiple CCEs can be combined to effectively reduce the coding rate of the control channel. CCEs are combined in a predetermined manner using a tree structure to achieve different coding rate.

On a transport channel level, the information transmitted via the PDCCH is also referred to as L1/L2 control signaling (for details on L1/L2 control signaling see above).

A common technique for error detection and correction in packet transmission systems over unreliable channels is called hybrid Automatic Repeat request (HARQ). Hybrid ARQ is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet. Generally (and throughout this document) the transmission of additional information is called "retransmission (of a packet)", although this retransmission does not necessarily mean a transmission of the same encoded information, but could also mean the transmission of any information belonging to the packet (e.g. additional redundancy information).

Depending on the information (generally code-bits/symbols), of which the transmission is composed, and depending on how the receiver processes the information, the following Hybrid ARQ schemes are defined.

In Type I HARQ schemes, the information of the encoded packet is discarded and a retransmission is requested, if the receiver fails to decode a packet correctly. This implies that all transmissions are decoded separately. Generally, retransmissions contain identical information (code-bits/symbols) to the initial transmission.

In Type II HARQ schemes, a retransmission is requested, if the receiver fails to decode a packet correctly, where the receiver stores the information of the (erroneously received) encoded packet as soft information (soft-bits/symbols). This implies that a soft-buffer is required at the receiver. Retransmissions can be composed out of identical, partly identical or non-identical information (code-bits/symbols) according to the same packet as earlier transmissions. When receiving a retransmission the receiver combines the stored information from the soft-buffer and the currently received information and tries to decode the packet based on the combined information. (The receiver can also try to decode the transmission individually, however generally performance increases when combining transmissions.) The combining of transmissions refers to so-called soft-combining, where multiple received code-bits/symbols are likelihood combined and solely received code-bits/symbols are code combined. Common methods for soft-combining are Maximum Ratio Combining (MRC) of received modulation symbols and log-likelihood-ratio (LLR) combining (LLR combing only works for code-bits).

Type II schemes are more sophisticated than Type I schemes, since the probability for correct reception of a packet increases with every received retransmission. This increase comes at the cost of a required hybrid ARQ soft-buffer at the receiver. This scheme can be used to perform dynamic link adaptation by controlling the amount of information to be retransmitted. E.g. if the receiver detects that decoding has been "almost" successful, it can request only a small piece of information for the next retransmission (smaller number of code-bits/symbols than in previous transmission) to be transmitted. In this case it might happen that it is even theoretically not possible to decode the packet correctly by only considering this retransmission by itself (non-self-decodable retransmissions).

Type III HARQ schemes may be considered a subset of Type II schemes: In addition to the requirements of a Type II scheme each transmission in a Type III scheme must be self-decodable.

Synchronous HARQ means that the re-transmissions of HARQ blocks occur at predefined periodic intervals. Hence, no explicit signaling is required to indicate to the receiver the retransmission schedule.

Asynchronous HARQ offers the flexibility of scheduling re-transmissions based on air interface conditions. In this case some identification of the HARQ process needs to be signaled in order to allow for a correct combining and protocol operation. In 3GPP LTE systems, HARQ operations with eight processes are used. The HARQ protocol operation for downlink data transmission will be similar or even identical to HSDPA.

In uplink HARQ protocol operation there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions). In case of a synchronous non-adaptive retransmission the retransmission will use the same parameters as the previous uplink transmission, i.e. the retransmission will be signaled on the same physical channel resources, respectively uses the same modulation scheme/transport format.

Since synchronous adaptive retransmissions are explicitly scheduled via PDCCH, the eNodeB has the possibility to change certain parameters for the retransmission. A retransmission could be for example scheduled on a different frequency resource in order to avoid fragmentation in the uplink, or eNodeB could change the modulation scheme or alternatively indicate to the user equipment what redundancy version to use for the retransmission. It should be noted that the HARQ feedback (ACK/NACK) and PDCCH signaling occurs at the same timing.

Therefore the user equipment only needs to check once whether a synchronous non-adaptive retransmission is triggered (i.e. only a NACK is received) or whether eNode B requests a synchronous adaptive retransmission (i.e. PDCCH is signaled).

The reception of system information (SI) is an operation to be performed by a UE on the basis of a scanned RF signal and a detected synchronization signal. In particular, upon the detection of synchronization signals the UE is capable of identifying a cell and of synchronizing with downlink transmissions by the cell. Accordingly, the UE may receive a broadcast channel, BCH, of a cell, and, hence, the corresponding system information. On the basis thereof, the UE can detect whether or not a cell is suitable for selection and/or reselection, i.e. whether the cell is a candidate cell.

System information is information which is transmitted in a broadcast manner to all UEs in a cell. It includes information necessary for cell selection and some parts thereof are to be read at any cell selection/reselection, after the UE synchronizes with the cell.

System information is structured by means of System Information Blocks (SIBs), each of which includes a set of parameters. In particular, system information is transmitted in a Master Information Block, MIB, and a number of System Information Blocks. The MIB includes a limited number of the most essential and most frequently transmitted parameters that are needed to acquire other information from the cell such as the downlink system bandwidth, an indicator of the resources allocated to HARQ acknowledgement signaling in the downlink, and the System Frame Number (SFN). The remaining SIBs are numbered; there are SIBs 1 to 13 defined in Release 8.

SIB1 contains parameters needed to determine if a cell is suitable for cell selection, as well as information about the time domain scheduling of the other SIBs. SIB2 includes common and shared channel information. SIBs 3 to 8 include parameters used to control intra-frequency, inter-frequency and inter-Radio Access Technology (RAT) cell reselection. SIB9 is used to signal the name of a Home eNodeB, whereas SIBs 10 to 12 include the Earthquake and Tsunami Warning Service (ETWS) notifications and Commercial Mobile Alert System (CMAS) warning messages. Finally, SIB 13 includes MBMS related control information.

The system information is transmitted by the RRC protocol in three types of messages: the MIB message, the SIB1 message and SI message. The MIB messages are carried on the Physical Broadcast Channel (PBCH) whereas the remaining SIB1 and SI messages are at the physical layer multiplexed with unicast data transmitted on the Physical Downlink Shared Channel (PDSCH).

The MIB is transmitted at a fixed cycles. The SIB1 is also transmitted at the fixed cycles. In order to improve robustness of the system information transmission, the system information is repeated. The repetitions have different redundancy versions and thus, they are not repetitions of the bits effectively transmitted but rather repetitions of the data carried but coded differently. For instance, MIB is transmitted every frame in the first subframe (subframe #0) wherein the new MIB (MIB with content possibly different from the previous MIBs) is transmitted every four frames and the remaining three frames carry its repetition. Similarly, repetition coding is applied for transmission of SIB1. A new SIB1 is transmitted every 8 frames. Each SIB1 has three further repetitions. All other SIBs are being transmitted at the cycles specified by SIB scheduling information elements in SIB1. In particular, the mapping of SIBs to a SI message is flexibly configurable by schedulingInfoList included in SIB1, with restrictions that each SIB is contained only in a single SI message, and at most once in that message. Only SIBs having the same scheduling requirement (periodicity) can be mapped to the same SI message; SIB2 is always mapped to the SI message that corresponds to the first entry in the list of SI messages in the schedulingInfoList. There may be multiple SI messages transmitted with the same periodicity.

Thus, a terminal determines the SI widow based on the signaled information and starts receiving (blind decoding) of the downlink shared channel using the SI-RNTI (an identifier meaning that signaling information is transmitted) from the start of the SI window and continue for each subframe until the end of the SI-window or until the SI message was received, excluding the subframe #5 in radio frames for which SFN mod 2=0, any MBSFN subframes, and any uplink subframes in TDD. If the SI message was not received by the end of the SI-window, the reception is repeated at the next SI-window occasion for the concerned SI message.

In other words, during blind decoding, the UE tries to decode PDCCH on each subframe of an SI-window the SI-RNTI but only some of these subframes really carry PDCCH (CRC) encoded using the SI-RNTI (corresponding to PDSCH containing the particular SI).

For further details on the definition of system information, see for example 3GPP, TS 36.331, V12.5.0, "3rd Generation Partnership Project; Technical Specification Group Radio Access Network; Evolved Universal Terrestrial Radio Access (E-UTRA); Radio Resource Control (RRC); Protocol specification (Release 12)", sections 6.2.2.7 and 6.3.1, available at http://www.3gpp.org and incorporated herein by reference.

As LTE deployments evolve, operators strive to reduce the cost of overall network maintenance by minimizing the number of RATs. In this respect, Machine-Type Communications (MTC) devices is a market that is likely to continue expanding in the future.

Many MTC devices are targeting low-end (low cost, low data rate) applications that can be handled adequately by GSM/GPRS. Owing to the low cost of these devices and good coverage of GSM/GPRS, there is very little motivation for MTC device suppliers to use modules supporting the LTE radio interface.

As more and more MTC devices are deployed in the field, this naturally increases the reliance on GSM/GPRS networks. This will cost operators not only in terms of maintaining multiple RATs, but also prevent operators reaping the maximum benefit out of their spectrum (given the non-optimal spectrum efficiency of GSM/GPRS). With users and traffic becoming denser, using more spectral-efficient technologies, such as Long Term Evolution (LTE), allow the operators to utilize their spectrum in a much more efficient way.

Given the likely high number of MTC devices, the overall resource they will need for service provision may be correspondingly significant, and inefficiently assigned (for further details on objectives for MTC, see for example 3GPP, RP-150492 Ericsson: "Revised WI: Further LTE Physical Layer Enhancements for MTC", section 4, available at http://www.3gpp.org and incorporated herein by reference).

Approaches to lower the cost of LTE presently regard the volume of products as the primary reason. The impact of volume can be seen in two possible ways, depending on how low-cost MTC is developed. Firstly, if low-cost MTC may be very similar to mainline LTE and included in LTE chipsets, MTC has the benefit of the volume of LTE. Secondly, a low-cost MTC based on LTE may have significantly lower cost than mainline LTE. Although it appears not to have the volume benefit of LTE, the volume of MTC devices can be even larger due to a potentially greater number of supported MTC applications and scenarios.

In this respect, the following approaches to lower the cost of LTE, i.e. defining low-cost MTC are discussed and found to have significant UE cost impact (for further details on low-cost MTC devices, see for example 3GPP, R1-112912, Huawei, HiSilicon, CMCC: "Overview on low-cost MTC UEs based on LTE", section 4, available at http://www.3gpp.org and incorporated herein by reference):—
Reduction in supported bandwidth for the low-cost LTE: The low cost of 1.4 MHz (6 RB) downlink bandwidth could cover most application scenarios of MTC. However, 3 MHz (15 RB) or 5 MHz (25 RB) could be considered given that the complexity does not increase much. Given that the uplink may have a larger requirement for MTC services, the possibility of reduced transmit power, and small baseband complexity (relative to downlink reception), any reduction in minimum transmission bandwidth in the UE should be carefully justified.

Modified PDCCH-related design for the low-cost LTE to simplify the PDCCH blind decoding and give efficient channel access for a large number of MTC devices. A reduction in maximum bandwidth (e.g., 1.4 MHz) decreases PDCCH blind decoding naturally.

Protocol simplification including HARQ consideration, MAC, RLC and RRC protocol. Signaling reduction between low duty cycle MTC devices and the base station.

Transmission modes down-selection to maintain coverage and balance complexity.

Further considerations on low-cost MTC devices relate to an improved indoor coverage. A number of applications require indoor deployment of Machine Type Communication, MTC, devices, e.g. in an apartment basement, or on indoor equipment that may be close to the ground floor etc. These UEs would experience significantly greater penetration losses on the radio interface than normal LTE devices. This effectively means that indoor coverage should be readily available and reliable: i.e. should provide a significant improvement on existing coverage.

Additionally, regarding the power consumption of low-cost MTC devices it is noted that many applications require devices to have up to ten years of battery life. In this respect, presently available Power Save Modes appear not sufficient to achieve the envisaged battery life. In this respect, it is anticipated that further techniques are proposed to significantly cut down the power usage of MTC devices e.g. by optimizing signaling exchanges in the system, in order to realize battery life of up to ten years.

For improving indoor coverage (for low-cost MTC devices), recent developments have focused on an Enhanced Coverage, EC, mode that is applicable to UEs e.g. operating delay tolerant MTC applications. Another term is "Coverage Extension". The corresponding Work Item in 3GPP Release 12 "Low cost & enhanced coverage MTC UE for LTE" came to the conclusion that further complexity reduction of LTE devices for MTC can be achieved if additional complexity reduction techniques are supported, as apparent from the technical report TR 36.888, v12.0.0, "Machine-Type Communications (MTC) User Equipments (UEs)", available at www.3gpp.org and incorporated herein by reference. The technical report TR 36.888 concluded that a coverage improvement target of 15-20 dB for both FDD and TDD in comparison to a normal LTE footprint could be achieved to support the use cases where MTC devices are deployed in challenging locations, e.g. deep inside buildings, and to compensate for gain loss caused by complexity-reduction techniques. MTC coverage enhancements are now expected to be introduced in 3GPP Release 13.

In general, the MTC devices may be low complexity (LC) MTC devices (which basically forces the device to receive a TBS of 1000 bits or less as a result of buffer size limitations and other implementation limitations) or enhanced coverage (EC) devices which are supposed to support a large number of repetitions.

In other words, LC are Low Complexity devices which are meant to be inexpensive devices with limited buffer sizes/simple implementation etc. whereas the EC devices are the coverage enhanced device that should operate in challenging situations like in basement or far away from the cell center.

The general objective is to specify a new UE for MTC operation in LTE that allows for enhanced coverage and lower power consumption. Some of the additional objectives are given below:

Reduced UE bandwidth of 1.4 MHz in downlink and uplink.

Bandwidth reduced UEs should be able to operate within any system bandwidth.

Frequency multiplexing of bandwidth reduced UEs and non-MTC UEs should be supported.

The UE only needs to support 1.4 MHz RF bandwidth in downlink and uplink.

The allowed re-tuning time supported by specification (e.g. –0 ms, 1 ms) should be determined by RAN4.

Reduced maximum transmit power.

The maximum transmit power of the new UE power class should be determined by RAN4 and should support an integrated PA implementation.

Reduced support for downlink transmission modes.

The following further UE processing relaxations can also be considered within this work item:

Reduced maximum transport block size for unicast and/or broadcast signaling.

Reduced support for simultaneous reception of multiple transmissions.

Relaxed transmit and/or receive EVM requirement including restricted modulation scheme. Reduced physical control channel processing (e.g. reduced number of blind decoding attempts).

Reduced physical data channel processing (e.g. relaxed downlink HARQ time line or reduced number of HARQ processes).

Reduced support for CQI/CSI reporting modes.

A relative LTE coverage improvement—corresponding to 15 dB for FDD—for the UE category/type defined above and other UEs operating delay-tolerant MTC applications with respect to their respective normal coverage shall be possible. At least some of the following techniques, which shall be applicable for both FDD and TDD, can be considered to achieve this:

Subframe bundling techniques with HARQ for physical data channels (e.g. PDSCH, PUSCH)

Elimination of use of control channels (e.g. PCFICH, PDCCH)

Repetition techniques for control channels (e.g. PBCH, PRACH, (E)PDCCH)

Either elimination or repetition techniques (e.g. PBCH, PHICH, PUCCH)

Uplink PSD boosting with smaller granularity than 1 PRB

Resource allocation using EPDCCH with cross-subframe scheduling and repetition (EPDCCH-less operation can also be considered)

New physical channel formats with repetition for SIB/RAR/Paging

A new SIB for bandwidth reduced and/or coverage enhanced UEs

Increased reference symbol density and frequency hopping techniques

Relaxed "probability of missed detection" for PRACH and initial UE system acquisition time for PSS/SSS/PBCH/SIBs can be considered as long as the UE power consumption impact can be kept on a reasonable level.

Spreading: Spreading refers to spreading of information across resources including time-frequency domain resources or even spreading using Scrambling (or Channelization) codes.

There can be also other techniques than those listed above. The amount of coverage enhancement should be configurable per cell and/or per UE and/or per channel and/or group of channels, such that different levels of coverage enhancements exist. The different levels of coverage enhancement could mean different level of CE techniques being applied to support the CE-device transmission and reception. Relevant UE measurements and reporting to support this functionality should be defined.

For more details, see for example 3GPP RP-141865 "Revised WI: Further LTE Physical Layer Enhancements for MTC" sourced by Ericsson, available at http/www.3gpp.org and incorporated herein by reference.

Notably, coverage enhancements of 15/20 dB for UEs in the Enhanced Coverage mode with respect to their nominal coverage means that the UEs have to be capable of receiving extremely low signal strengths. This applies not only to the initial scanning operation, the cell search and the cell selection operation but also the subsequent communication scheme to be performed by the UE. As described above, there will be different levels of CE depending on the network support and UE capability, e.g. 5/10/15 dB coverage extension.

Early attempts to define the Enhanced Coverage mode have focused on modifications of the radio transmissions. In this respect, discussions have focused on repeated transmissions as being the main technique to improve the coverage. Repetitions can be applied to every channel for coverage improvement.

An exemplary implementation of these repeated transmissions prescribes that the same data is transmitted across multiple sub-frames. Yet, it will become immediately apparent that these repeated transmissions will use more resources (time-frequency) than what is required for normal coverage UEs. RAN1 indicated that the transport block size used for transmission to the MTC devices will be less than 1000 bits.

In view of the above requirements, a new information message scheduling will be necessary to minimize the system overheard as well as not to affect the system of previous releases and legacy UEs served thereby.

SUMMARY

One non-limiting and exemplary embodiment provides apparatuses and methods for an efficient transmission and reception of system information in a wireless network.

In one general aspect, the techniques disclosed here feature an apparatus for receiving system information in a wireless communication system supporting coverage enhancement, including: a receiver that receives system information; and a controller that controls the receiver to receive system information including a coverage enhancement level indication for indicating enhanced coverage levels supported by the wireless communication system, and to receive system information including a group of information elements common for different coverage enhancement levels and one or more groups of information elements specific for different coverage enhancement levels.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

The above and other features of the present disclosure will become more apparent from the following description and preferred embodiments given in conjunction with the accompanying drawings.

BRIEF DESCRIPTION OF THE DRAWINGS

FIG. 10 is a schematic diagram illustrating interleaving of transmission of different SIB/SI.

DETAILED DESCRIPTION

Figure 1:
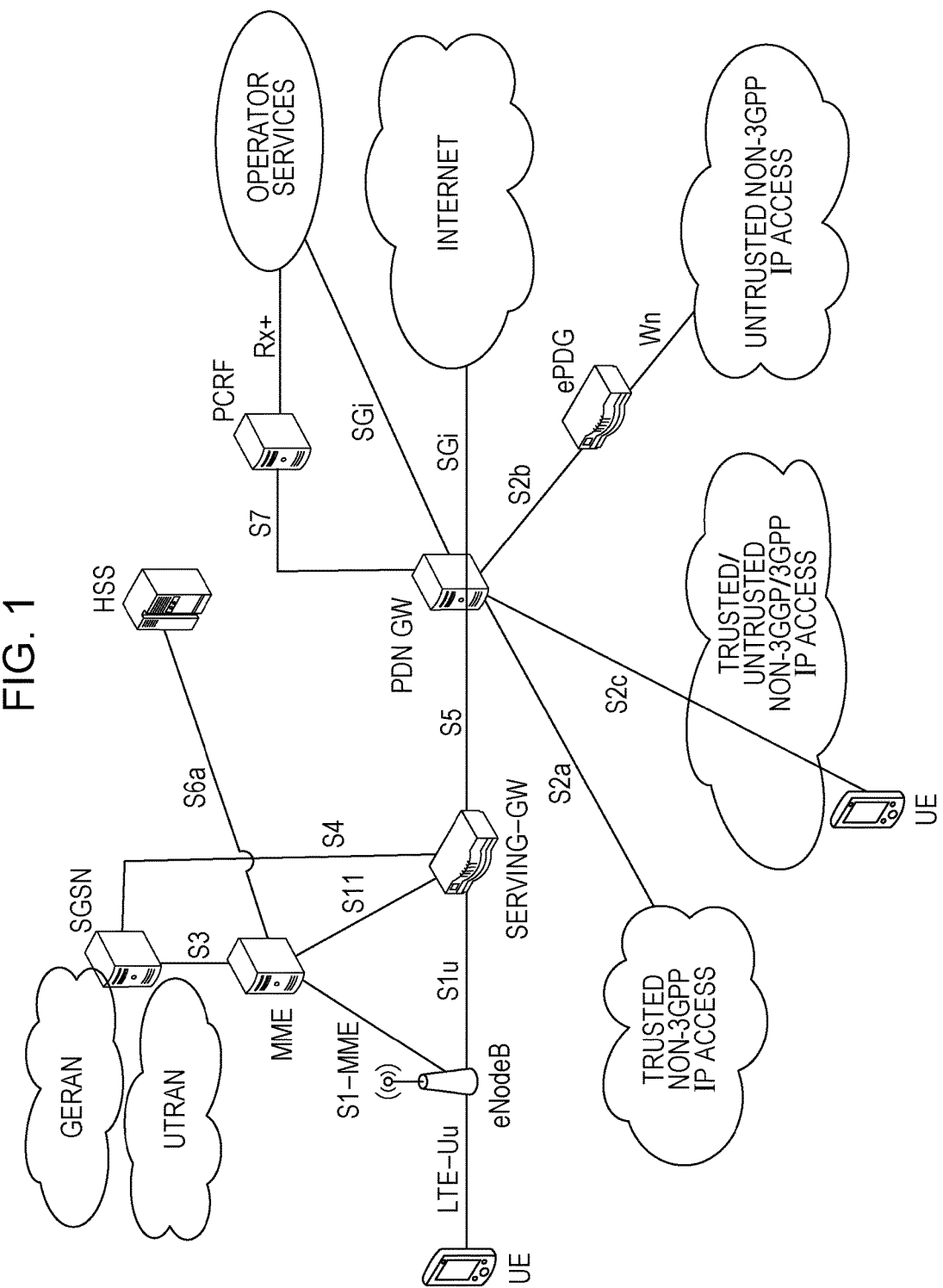
FIG. 1 is a block diagram illustrating a current 3GPP architecture for machine-type communication.
Figure 2:
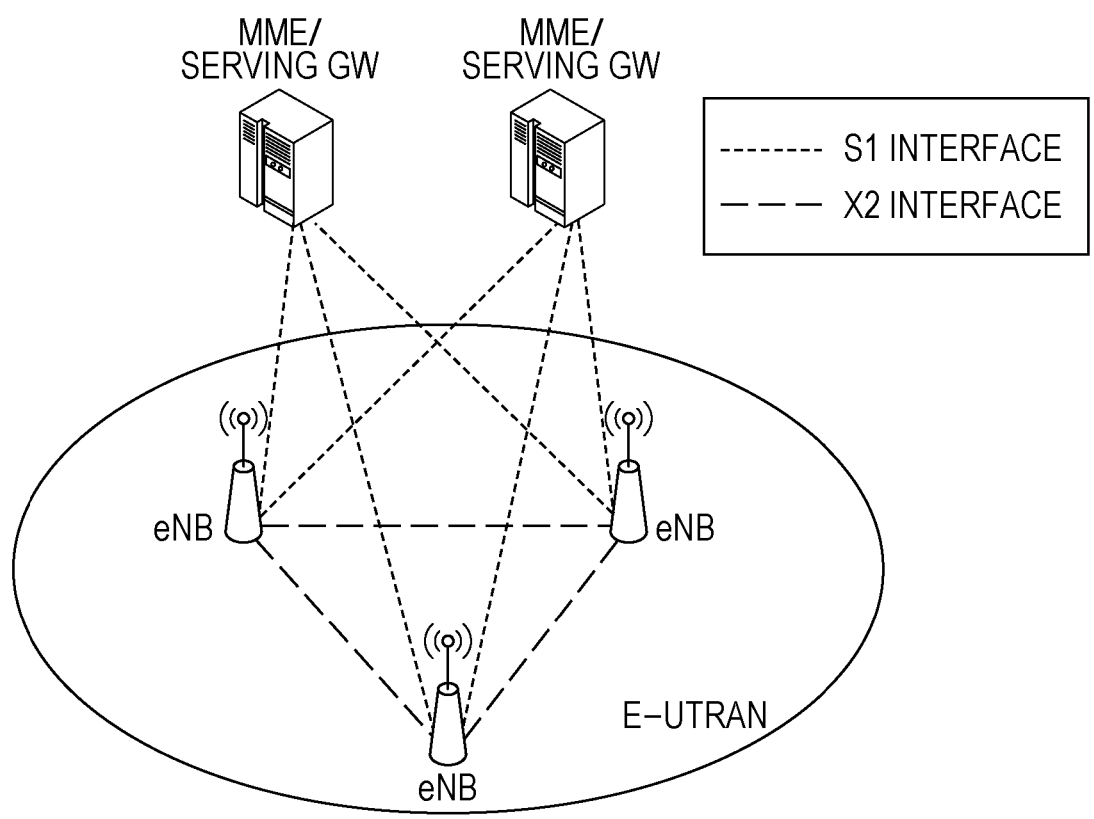
FIG. 2 is a block diagram illustrating an exemplary architecture of a radio access network in 3GPP LTE.
Figure 3:
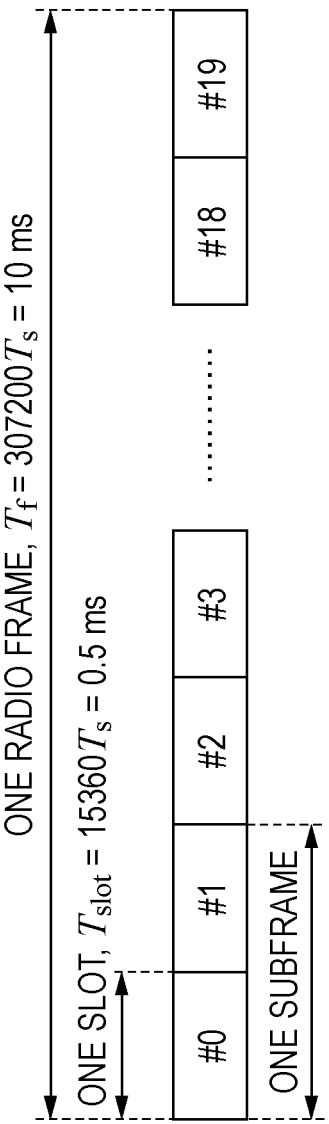
FIG. 3 is a schematic diagram illustrating the general structure of a frame in 3GPP LTE FDD.
Figure 4:
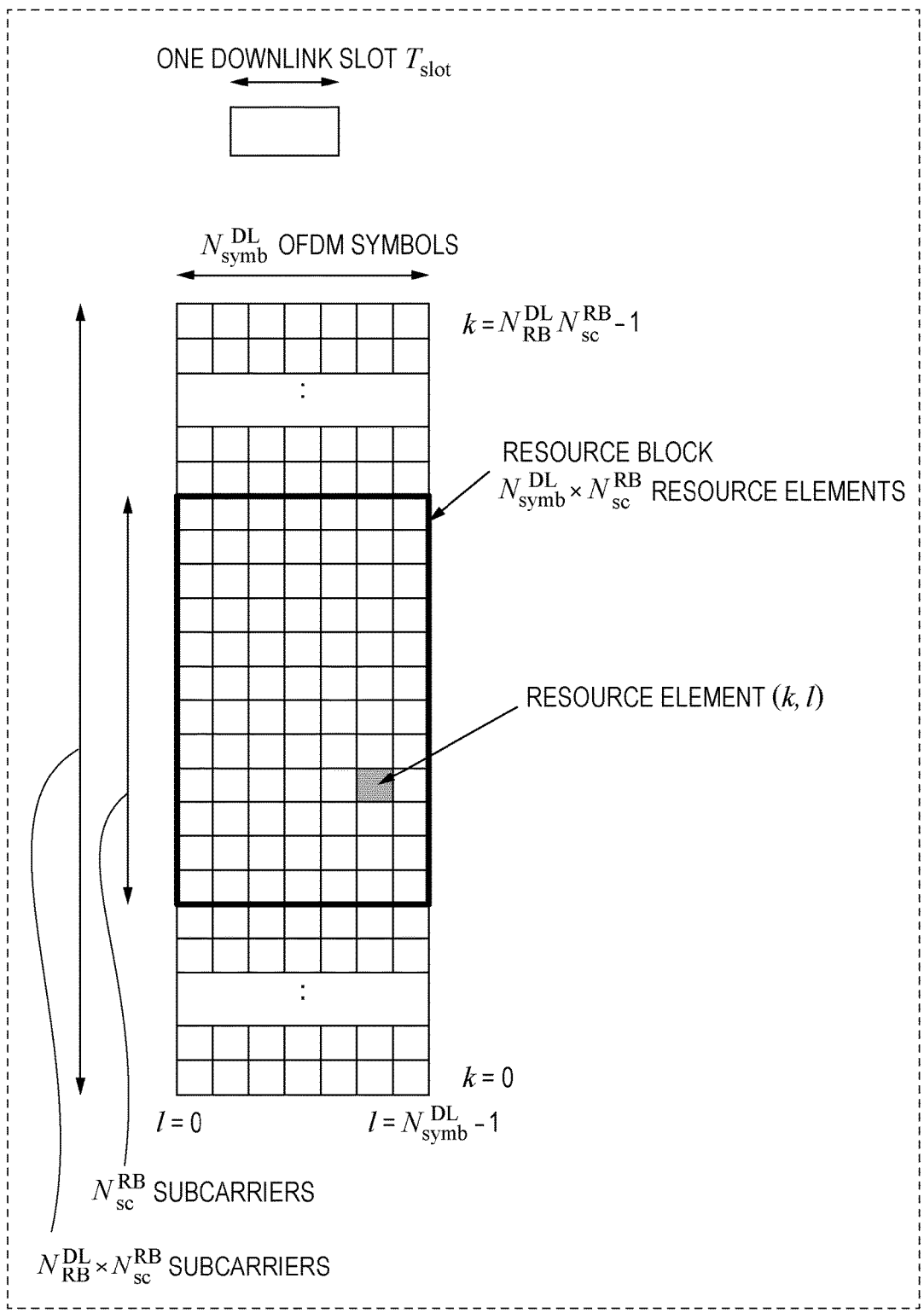
FIG. 4 is a schematic diagram illustrating the general structure of a sub-frame on a downlink component carrier defined for 3GPP LTE.

The present disclosure relates to transmission and reception of system information in a wireless communication system which is particularly suitable for transmission and reception of system information for machine type communication such as the MTC in the 3GPP LTE. The system information signaling has been recently discussed in 3GPP and the following aims have been preliminarily agreed on:
- maintain the flexibility similar to the one offered by the current SIB concept, i.e., the size of the SIBs should not be fixed.
- branch from SIB1, i.e., LC/EC UEs receive a separate occurrence of SIB1 and others (different time/frequency resources). The new SIB1 is common for EC and LC.
- transmit SIB1 information separately from other SIBs (in particular to low cost UEs in normal coverage), if feasible in terms of overhead and total acquisition time.
- the scheduling information (time, frequency and MCS/TBS) allowing acquiring SIB1 for LC/EC UEs could e.g. be carried in MIB, i.e., dynamic L1 information in PDCCH is not needed.
- SIB1 for LC/EC UEs could contain scheduling information (time, frequency and MCS/TBS) allowing acquiring subsequent SIBs without reading PDCCH.
- the TB size restriction of 1000 bit for broadcast may be acceptable, assuming that the network provides separate SIBs (different time/frequency resources) to LC/EC UEs and legacy UEs.

If the current mechanism for transmission of system information is applied for communication applying a large number of repetitions such as MTC communication, each of the SIBs currently used will be transmitted with approximately 50 times higher repetition rate. In general, the repetition rates may be also higher such as more than 200 repetitions. The number of repetitions may also be variable (configurable).

These would affect, for instance:

the acquisition time for the system information by the legacy UEs if the system information blocks do not overlap and thus, repetition of the system information would cause longer transmission delay of the system information block and therefore also increased the delay of the transmission of the next system information block, repeated transmissions of the entire system information would also lead to a huge system load, which may be unnecessary since the MTC devices does not make use of all information transmitted in the current system information signaling. Accordingly, the MTC UEs would receive irrelevant system information.

The reception of the entire system information that would increase power consumption in the MTC device.

It is beneficial to provide several possible levels of coverage enhancement. However, any additional overhead which may result from additional signaling concerning different coverage enhancement levels may be critical especially in view of the high number of repetitions that may be necessary for some of the coverage enhancement levels in order to convey the information. Accordingly, it is beneficial to provide an efficient signaling concerning the support of multiple coverage enhancement levels.

Advantageously, a cell indicates, which CE level(s) it does support. This indication may be broadcasted in the cell within the system information so that the terminals are able to receive the information and decide whether to apply the corresponding CE level operation.

For instance, the CE levels supported may be transmitted within the system information and in particular within the master information block (MIB) which is broadcasted on a physical layer. In the LTE, the MIB is transmitted via physical broadcast channel which can be received and decoded by any terminal. However, the present disclosure is not limited thereto and the broadcast may be performed over downlink shared channel. For instance, the CE levels may be indicated within SIB1. Still alternatively, the CE levels may be transmitted in another SIB, the location of which is either scheduled (for instance in the MIB or SIB1 or another specific SIB) order to remind by blind decoding applying SI-RNTI or an RNTI specific for MTC operation.

From the above possibilities, transmitting the CE levels within the MIB has the advantage that the information on the CE levels is immediately available to the terminals via physical broadcasting. This increases the probability and decreases delay of acquisition of the CE levels. On the other hand, generically the information signaled within the MIB should be minimized in order to use the resources efficiently and to avoid the terminals read broadcast information which is not necessarily important for them. On the other hand, signaling the CE levels in SIB1 provides the advantage that no further blind detection using SI-RNTI or other group RNTI is necessary to find other SIBs. This is beneficial especially for MTC terminals which may suffer from bad channel conditions (being located on the border of the coverage in the cell) or which have technically simple implementation and are supposed to possibly efficiently use the power. Still alternatively are directly scheduled SIB other than MIB or SIB1 may be used for signaling the CE levels.

Different levels of CE applicable for communication between the UE and the network depend on the network support and on the UE capability. For instance, 5, 10, or 15 dB (or even more) coverage extension may be supported and denoted as respective low, medium, and high CE levels. A normal coverage may be referred to as zero (0 dB) coverage extension, i.e. no extension.

Certain information elements (IEs) carrying parameters of the system information may have the same value for different CE levels, whereas other IEs are to have different/unique values among the different levels. For instance, some examples of common value SIBs are typically SIBs like ETWS/CMAS as briefly described above, and IEs such as different neighbor lists (intra-freq, inter freq, inter RAT etc.) and ACB, Access Class Barring, (cell level). Some examples of different/unique values among the different levels of CE are Cell (Re) Selection parameters (like q-RxLevMin, q-RxQualMin etc.), PRACH parameters and some others in RadioResourceConfigCommon SIB3, EAB (SIB14) etc.

For instance, possible typical values of qRxLevMin (in dBm) specified in SIB for sale detection/reselection for respective different CE levels are exemplified below:

q-RxLevMin_zero—60
q-RxLevMin_low—50
q-RxLevMin_med—40
q-RxLevMin_high—30

According to an embodiment of the present disclosure, there is provided efficient signaling and packing of system information which may be common as well as different for different CE levels.

Signaling together system information related to all CE levels may lead to severe cell overload. On the other hand, separate signaling for each CE level may complicate the eNB scheduler and UE behavior in acquiring and re-acquiring of the system information upon change of levels and upon SI change notifications.

One possible approach is to pack all information irrespective of the CE levels together, structured as in legacy case, i.e. no coverage enhancement. In this approach, when needed, an IE will have exactly as many values as the number of CE levels supported, i.e. one per CE level. However, since the CE specific techniques like repetition number may be different for each CE level, the above approach might lead to unnecessary system load as illustrated in the following calculation. Let us assume that the number of repetitions applied to each data block for zero, low, med, high CE levels is respectively 4, 10, 20, 50 repetitions and the size of a legacy SIBx is 100 (bits).

If separate SIBs are transmitted for each CE level, the respective number of bits necessary will be 4*100, 10*100, 20*100, and 50*100 resulting in the total overhead of 400+1000+2000+5000=8400 bits. If on the other hand, the information elements for all CE levels are parked in the same system information block, this blog has to be repeated maximum number of time, i.e. 50 times, resulting in total overhead of 50*400=20000 bits. If a compromise solution is chosen and to system information blocks are used, each for two CE levels, the total overhead amounts to 10*200 and 50*200, resulting in 2000+10000=12000 bits.

As can be seen from the above examples, the structuring and grouping of the information concerning the different coverage enhancement levels has a high impact on overhead transmitted and thus also to the transmission efficiency.

As discussed above, it is beneficial to provide the CE levels supported in the cell by means of the cell broadcast. The CE level indication may have different formats. For instance, the CE levels supported may be explicitly signaled (e.g. in SIB1 or MIB or in another way as mentioned above) for instance by listing them.

However, in order to save some signaling bits, only the highest supported CE level may be signaled explicitly. A device receiving such indications signaling the highest supported CE level then assumes that all lower CE levels are also supported.

Still alternatively, the CE levels may be indicated indirectly, for instance, by broadcasting as many values of a particular parameter (e.g. related to Cell Selection or Cell Reselection parameters like q-RxLevMin) as there are the supported CE levels. In order to make the mapping unambiguous, the values are ordered in a predefined manner, for instance starting with the specified highest CE level and coming down to the lower levels or starting with the specified lowest CE level and going up to the higher levels or any other way.

In order to efficiently signal information elements for different CE levels, according to an exemplary embodiment, all IEs with different content (value) for different CE levels are grouped per CE level. For instance, there is one SIB per CE level. The remaining IEs which have the same content (values) for all CE levels are grouped together in another one SIB common for all CE levels. This approach is illustrated in FIG. 5.

Figure 5:
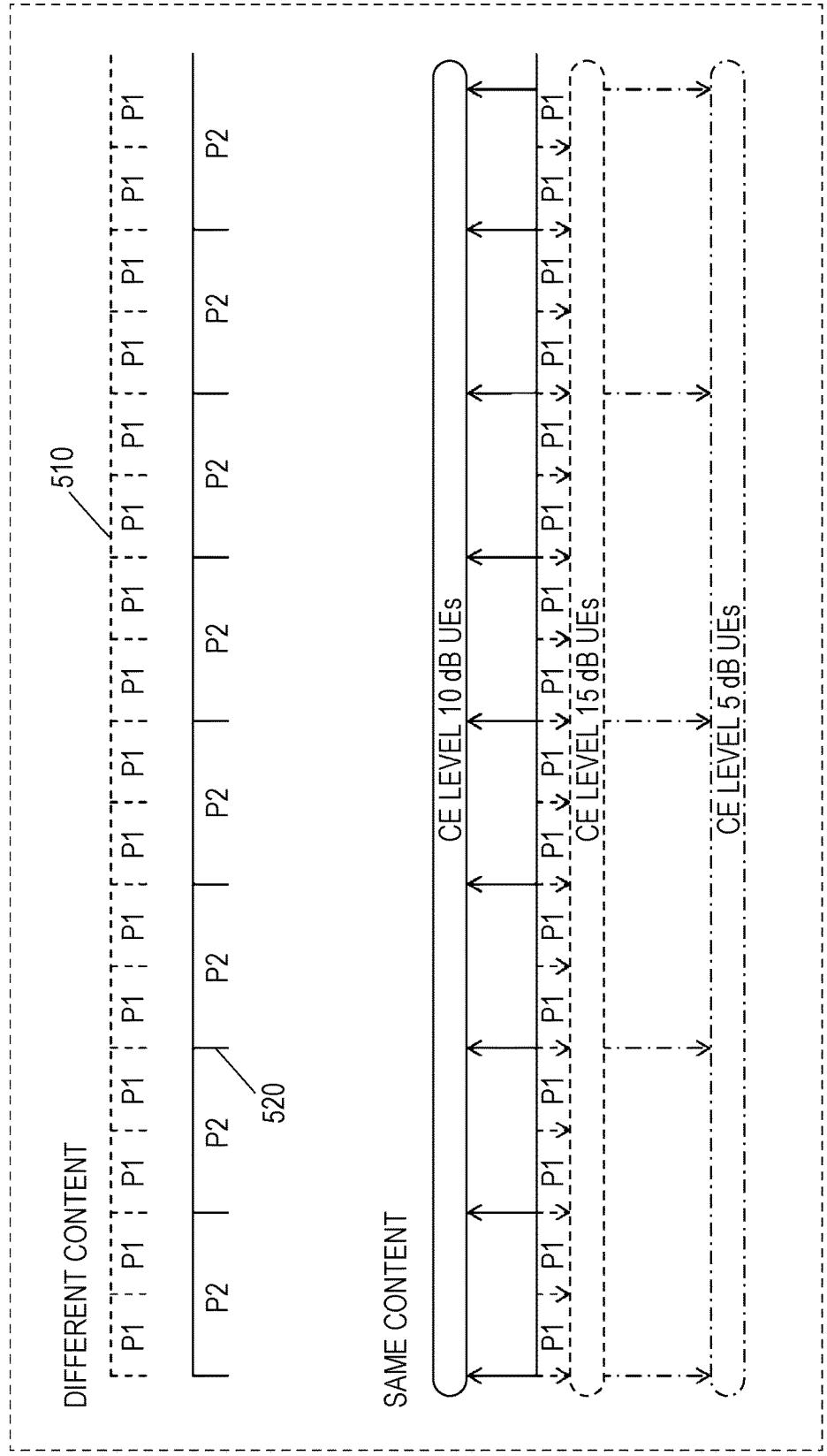
FIG. 5 is a schematic diagram illustrating grouping of information elements of system information into system information blocks for different CE levels.

FIG. 5 illustrates in the upper part transmission of information elements which have different content for different respective CE levels. The term "content" here refers to the values of particular parameters. The values do not have to be effectively always different. Rather what is meant is that they may be set to different values for different respective CE levels. As explained above, the values for different CE levels are advantageously transmitted with different number of repetitions. In this example, correspondingly, the values for different CE levels are also transmitted with different periodicity.

In the different content case shown in the upper part of FIG. 5, there are two different SI/SIB transmissions (cf. solid line and dashed line, respectively). The content illustrated by a solid line 510 here represents higher CE levels and is therefore transmitted more frequently than the content illustrated by the dashed line 520 which represents lower CE levels.

In FIG. 5, "P1" denotes the first periodicity (frequency) of transmitting system information for the first CE level which is higher than the second periodicity (frequency) denoted as "P2" for transmitting SI concerning the second CE level lower than the first CE level. It is assumed that lower CE level means smaller coverage enhancement whereas a higher CE level means larger coverage enhancement (reception possible also at lower signal strength than for the lower CE levels).

The bottom part of FIG. 5 illustrates transmission of information elements which have common content for different respective CE levels (levels of 5 dB, 10 dB and 15 dB corresponding to "low", "middle" and "high" and denoted with different respective types of lines in the figure). In this "same content" case, the transmission periodicity is determined according to the worst (e.g. 15 db CE) extension (cf. "P1" in the figure). However, the terminals supporting other CE levels (5 dB, 10 dB) may read (receive and store/attempt to decode) the SI less frequently as is illustrated by the arrows with different respective types of line.

In order to save battery power at the wireless device, the wireless devices (UEs) with better reception quality (i.e. lower CE level) performed the reception of the common content less frequently than it is transmitted.

It is noted that the wireless terminal which successfully received the information after a number of repetitions lower than the maximum number of repetitions may stop receiving the remaining repetitions.

Another strategy that these UEs could employ is to accumulate and soft combine receptions using all or most of the frequent transmissions and after a successful reception just enter sleep mode. In other words, the wireless device tries to decode the system information after reception of each repetition and as soon as the decoding succeeds, the reception of further repetitions is stopped. This strategy provides the advantage of possibly faster acquisition of the system information. For non-Broadcast e.g. dedicated or unicast message(s) like Paging, the UE may even inform the network upon stopping so that the network can stop the further (re) transmissions of the dedicated or unicast message(s). In other words, the wireless device may further include a transmission unit for transmitting to the network and notification of terminated reception of the system information.

Concerning the term "repetition", this term is not limited to bit-wise repetition on the physical layer. On the contrary, the repetitions may be different redundancy versions or, generally, different versions of the same system information content. The concept of retransmissions and combining with HARQ has been described above in the background section. However, the principles of transmitting different redundancy version of the coded data may be extended to any repeated transmission scheme without requiring any feedback from the receiver. In case of system information, which is broadcasted to be received from a plurality of terminals, no feedback schemes are used. However, instead of providing mere repetitions of the system information, it is beneficial to transmit different redundancy versions in order to increase combining gain. Thus, also an exemplary embodiment of the present disclosure, combinable with any other embodiments of this disclosure, includes transmitting different redundancy versions of encoded system information (i.e. different portions of the encoded system information) similarly to the retransmissions as described above for HARQ and as employed in the current LTE/LTE-A standard. The combining may also work in the same way, for instance the incremental redundancy combining, possibly alongside with the soft combining of different repetitions of the redundancy versions transmitted).

In other words, in the "same content" case, there is only one content (SI/SIB) transmission but the receiving UEs receive the content with frequency (corresponding to periodicity) based on their respective operating CE level.

For example, UEs with configured 5 dB CE level will receive the common content only 5 times in the given time period, on the other hand, UEs with configured 10 dB CE level will receive the common content twice as often, i.e. 10 times in the given time period. Moreover, UEs with configured 15 dB CE level will further receive the common content more often, for instance twice as often as the 10 dB level UEs (i.e. 20 times in this example).

The given period may correspond to the system information window or a multiple thereof, which is a time domain interval in which one system information message (SI message as in legacy system described above) and their respective repetitions are conveyed.

In practice, having as many SIBs as CE levels may be difficult to accept since it represents a very different approach from legacy system where the grouping is mainly based on logical purpose/usability. Moreover, providing separate SIBs for all respective separate CE levels may add to complexity of scheduling and SI change notification given that the scheduler has to now take care of 4 times more SIB/SIs corresponding to the four levels of CE. When an IE that has different value for each of the CE level changes then the Change Notification needs to be sent to the concerned UEs. Since the concerned UEs need different CE support even to receive the SI Change Notification, this adds further burden on the eNB scheduler.

Accordingly, it may be beneficial to keep the legacy system unaffected by the updates of the MTC specific SIBs. A new, separate New Value Tag or Tags may thus be provided in order to signal to the wireless devices that the system information concerning MTC operation and in particular CE operation has changed. The new value Tag may be separate for the "Different Content" group and for the "Common Content" group. Moreover, the new value Tag may be specific and separate for each CE level or for each CE level group (e.g. Groups A and B as described below). The type of change may also be signaled within a paging message which is transmitted from the network to the wireless devices to notify them of the system information change. The type of change may indicate the CE level for which the SI changed and/or whether the change concerns the IEs common for all CE level or the IEs specific for each level.

The modification period (smallest time period after which the SI may change) may also be set differently and independently for the "Common Content" and the "Different Content" system information. In addition, the change period may also be set differently for different respective CE levels or CE level groups.

It is noted that different SI/SIB may also be transmitted in an interleaved manner as illustrated in FIG. 10. In particular, as can be seen from the three diagrams (a), (b), and (c), there are at least three ways to arrange the SI transmission with or without interleaving of SI/SIB. In the first scheme (a), the maximum number of transmission for a SIB/SI is completed and then the transmission for the next one SIB/SI starts. This is the scheme without interleaving.

In the second scheme (b), SIB/SIs are interleaved and a transmission is made once in each 20 ms period. This scheme should further benefit from the time diversity and likely fewer transmissions than maximum number of transmission for a SIB/SI in the first scheme would be required.

As the receiver behaviour, two schemes are possible. Scheme A is to have more than one HARQ process (as many as the number of interleaved Sis—in this example 2). Then, after one cycle of SI transmission period, UE could receive multiple SIs simultaneously. Scheme B is the receiver has only one HARQ process and only to receive one SI during one SI transmission period. In order to receive "n" SIs, UE needs to receive "n" cycles of SI transmission periods.

This scheme B may be applied by the receiver irrespectively of whether interleaving is applied by the network.

In the third scheme (c), only the corresponding SIB/SI transmissions are spread by 20 ms; whereas the broadcasting is taking place every 10 ms (in 2 SIB/SI interleaving case).

In the table below a comparison is made among the three schemes.

Table 2

| | Advantages | Disadvantages |
|---|---|---|
| Scheme 1 FIG. 10 (a) | Requires one HARQ process/buffer in the MTC devices | Could require some more transmissions than scheme 2A. |
| Scheme 2 FIG. 10 (b) | Good from Broadcast Overhead perspective (5% = 1/20) Best from Broadcast Overhead perspective (<5%) | Scheme A: Requires more than one HARQ process (as many as the number of interleaved SIs) Scheme B: Longest time required to receive multiple SIs. |
| Scheme 3 FIG. 10 (c) | Quickest total System Information acquisition | Requires more than one HARQ process (as many as the number of interleaved SIs) Double the Broadcast Overhead perspective (10%) |

Given the delay tolerant nature of the MTC application, the Schemes (a) and (b) seem to be advantageous. If Low Complexity/Cost discourages more than 1 HARQ buffer for broadcasting, then Scheme (a) is advantageous which also maintains the legacy principle of non-overlapping SI-windows. However, from Coverage Extension perspective, Scheme (b) might be better suited. It is noted that the above example only shows interleaving of 2 different SIBs (system information). However, in general, the interleaving may be also performed for any other number of SIBs. As mentioned above, the interleaving is similar to the concept of HARQ processes even if in case of SIB/SI there are no retransmissions based on feedback. However, the repetitions/versions of one SIB/SI may be considered as retransmissions of the same data.

Moreover, in general one particular SI may have one particular modification boundary and another will have another particular modification boundary and the two might overlap. Modification boundary here refers to the time point at until when the system information will not change but only from the start of the next modification period.

In general, the transmission of a plurality, N (N>1 being integer) types of system information may be interleaved which means that N different system information (SIBs) are transmitted cyclically a predefined number R of repetitions/versions (R being integer larger than 1). According to an embodiment, there are only two groupings of the same IEs for two respective groups of EC levels. But the boundary of the two groupings can be flexible, for instance as shown in the following.

1) a first grouping "Grouping-A" for zero CE level and a second grouping "Grouping-B" for low, medium, and high CE level
2) a first grouping "Grouping-A" for zero and low CE level and a second grouping "Grouping-B" for medium and high CE level
3) a first grouping "Grouping-A" for zero, low, and medium CE levels and a second grouping "Grouping-B" for high CE level
4) only one grouping which is the same regardless of the CE level (zero, low, medium, high)

For instance, the applicability of the above configurations 1) to 4) may be signaled within system information carried by SIB1 or a SIB carrying scheduling information (as will be exemplified below with reference to FIGS. 6 and 7).

Moreover, Grouping-A may be indicated by a separate SIBx-A (x denoting any SIB like SIB1 or SIB etc., e.g. SIB2-A means SIB2 for group A) and Grouping-B may be indicated by a separate SIBx-B different from SIBx-A. The number of the repetitions (and/or redundancy versions) can be different between SIBx-A and SIBx-B. Advantageously, SIBx-A and SIBx-B are carried in their respective separated SI messages (separately). Their scheduling may also be independent. Number of repetitions (versions) may also differ for SIBx-A and SIBx-B and depend on the CE levels included.

The SIB1 or the scheduling Information (wherever signaled) may also indicate further scheduling details of SIBx-A and SIBx-B, such as frequency position (PRB start and/or end, subframe pattern or specific time domain positions, frequency hopping flag etc.

It is noted that the above interleaving as shown in FIG. 10 may be applied to the different groups as described above. FIG. 10 shows overlapping of 2 different SIBs. These SIBs may be SIBx-A and SIBx-B as exemplified above, i.e. SIBs carrying different CE-level groupings. Alternatively or in addition, the interleaving (as shown by dashed and solid lines in FIG. 10, schemes (b) and (c)) may be performed between the "Common Content" SI and between CE level specific CEs.

The above example described with reference to FIG. 5 shows that the periodicity with which the CE level specific information is transmitted may also be specific for a CE level, i.e. different for at least two different CE levels. In other words, the IEs specific for each CE level may be grouped for each respective CE level. For instance, one SIB may include IEs from only one CE level. Alternatively in general, the IEs specific for each CE level may be grouped for a plurality of CE levels. For instance, one SIB may include IEs from two or more CE levels. It is noted that this can also be implemented by providing IEs with two or more values for the respective two or more CE levels. Especially in case in which a plurality of CE levels are grouped and transmitted with the same frequency, other receiving terminal may be configured to receive the IEs with the frequency lower than the frequency with which these IEs are transmitted. This approach may help reducing the power consumption at the terminal.

For instance, let us assume a case in which IEs of two CE levels (middle and high) are transmitted with a first periodicity corresponding to the high CE level so that the wireless devices applying the high CE level are also able to receive this system information. Let us assume that a wireless device is applying the middle CE level. This wireless device does not necessarily need to receive all transmissions and in order to save battery power it may be configured to receive the IEs less frequently than given by the first periodicity.

In the above example, it is assumed that there is a certain time period in which the transmission of system information concerning the different CE levels and including the repetitions is to be completed. Therefore, the certain time period corresponds to the maximum time in which the acquisition of the system information can be performed. The number of repetitions for different CE levels differs, which results in this case into different frequency of transmitting the IEs (SIBs) for different CE levels.

However, the present disclosure is not limited to this approach. In general, the number of repetitions may vary without the requirement of keeping them within the same time period. Thus, the periodicity (frequency) of transmitting system information corresponding to different CE levels may remain the same. This means that the maximum time for acquisition of the system information for the CE level currently applied would depend on that CE level.

In the following an exemplary operation of a system information receiving apparatus is described. This may be a wireless device such as a terminal (UE) of any form, for instance a mobile phone, smart phone, tablet, laptop, PC, wireless card, USB connectable receiver, or any other device.

A wireless device supporting coverage enhancement may at first determine its CE level. The determining of the appropriate level may be performed e.g. based on pathloss calculations and/or cell measurements or the like. Then, the wireless device checks if the cell in which it is located supports the determined CE level. This checking is performed by receiving broadcast information including a CE level indication. The CE level indication may be received, for instance in MIB or SIB1 or in another SIB as discussed above. It could implicitly be signaled by looking at the number of transmitted values (instances) of one of the parameters (out of many such possible candidates) as explained earlier. Based on the received CE level indication, the wireless device determines if the required CE level is supported in the network. The UE may determine the 'required' CE level by means of the time/effort required to detect a cell, or by the time/effort required to receive MIB or some other SIB or even the reception quality like RSRP (Reference Signal Received Power) or RSRQ (Reference Signal Received Quality) or even using pathloss estimate (higher the pathloss, higher the required CE Level). Based on the CE level set, the wireless device determines its interest/need for SI acquisition i.e. whether "different content" type or "same content" type is to be received and with which frequency. This determination may be based for instance on a behaviour defined in specification and/or based on a scheduling information. In particular, the scheduling of the common SIBs and/or the CE level specific SIBs may be defined by a scheduling information transmitted within system information such as MIB or SIB1 or another SIB. Alternatively, the scheduling may obey certain rules defined in a specific case of standard and may require blind detection using a group RNTI such as an MTC specific MTC-RNTI or general SI-RNTI for system information or EC-RNTI specific for coverage enhancement or for a particular CE level.

Then, the wireless terminal acquires the corresponding scheduling information and thereafter the SI intended (desired and corresponding with the own determined CE level), by waking up to receive SI only according to its schedulings (irrespective of transmission frequency).

The devices which do not support CE, may further operate as in the legacy system (current LTE standard), i.e. operate normally in good coverage; or declare out of service in bad/extended/no coverage.

Figure 6:
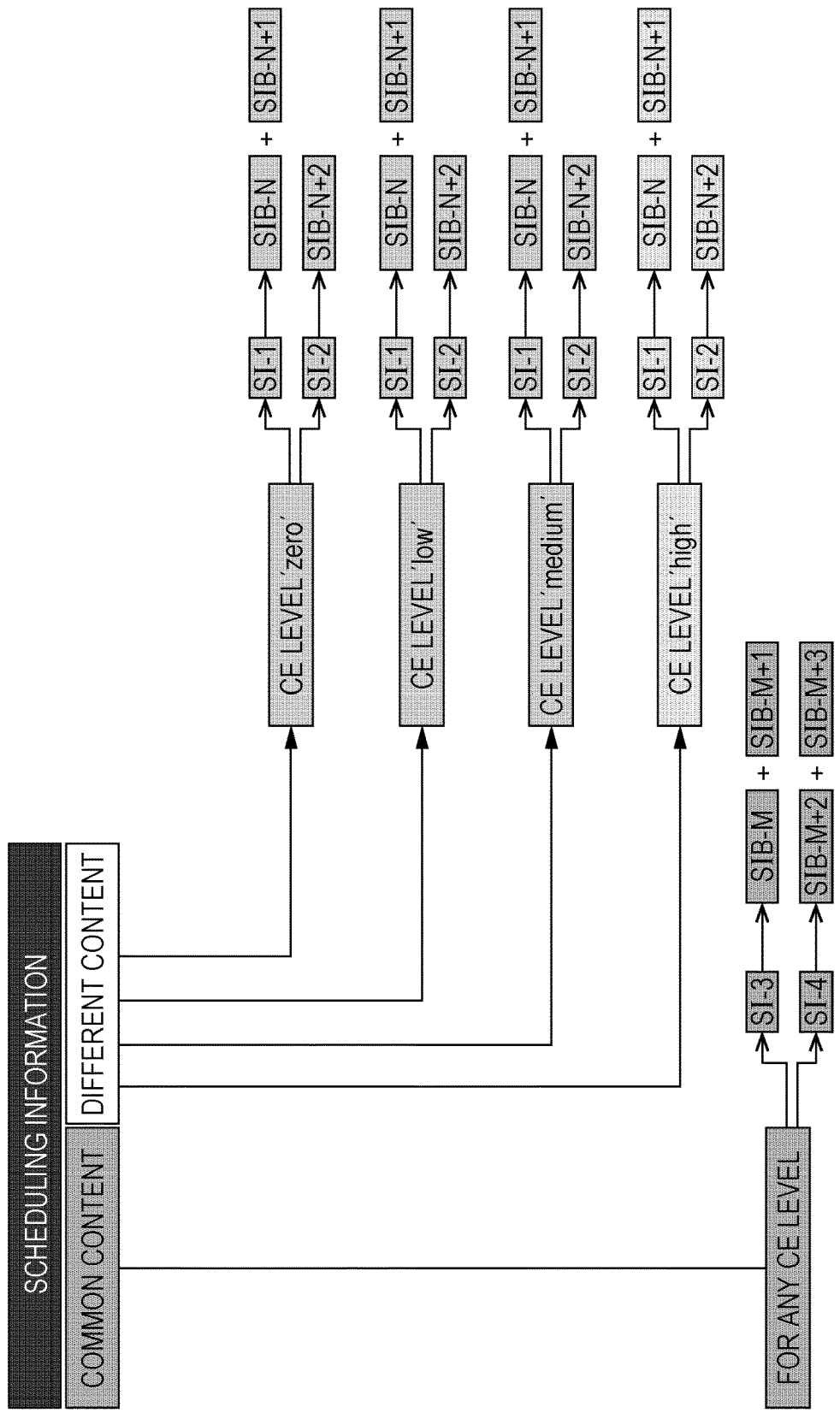
FIG. 6 is a schematic diagram illustrating an exemplary system information block structure for different CE levels.

FIG. 6 illustrates an example of acquiring system information according to an embodiment. In particular, the network advertises the CE levels supported in an implicit or explicit manner as described above, i.e. by including the CE levels explicitly into the information broadcasted in the cell or by deriving the CE levels from other parameters broadcasted in the cell.

Then or before this step, the wireless device detects its current CE level. This may be performed for instance based on pathloss calculation (and/or RSRP, Reference Signal Received Power, or Q measurements such as Reference Signal Receive Quality, RSRQ).

Following are examples of conditions which may be used to the determined the current CE level by the wireless device:
1) if x<Pathloss then the CE level is the determined as high
2) if y<Pathloss<x then the CE level is the determined as medium
3) if z<Pathloss<y then the CE level is the determined as low In the above conditions the following inequality applies x>y>z and the parameters x, y, and z are thresholds on pathloss which may be broadcasted within system information, for instance in MTC SIB1 or in MIB or in another SIB. Alternatively, similar conditions may be formulated for RSRP or RSRQ or for any other measured variable reflecting channel conditions and the corresponding thresholds may be advertised by the network or defined within the standard.

After determining its own CE level, if the determined CE level is supported by the network, the wireless (MTC) device acquires the "Different Content" and the "Common Content" system information for its determined CE level, as illustrated in FIG. 6.

The reception of the system information related to the determined CE level may be facilitated by receiving scheduling information which is transmitted by the network within the cell. In particular, the scheduling information may be broadcasted as a part of SIB1. However, the present disclosure is not limited thereto and the scheduling information for system information concerning different CE levels may also be provided within a standalone system information block. In order to keep the complexity low, such standalone system information block may be directly scheduled from SIB1 (or MIB). However, these are only examples and in general the system information for particular CE levels may be scheduled in another way, for instance in the MIB or in a system information block for which blind detection is necessary.

FIG. 6 illustrates an exemplary grouping of the information elements pertaining to different CE levels. In particular, the common content which is the same for all possible CE levels may include system information messages SI-3 and SI-4. System information messages are (in the LTE terminology) RRC protocol messages, of which each may include one or more system information blocks as described above in the background section. In the present example, system information message SI-3 includes two system information blocks, namely SIB-M and SIB-(M+1). On the other hand, system information message SI-4 includes two other information blocks, namely SIB-(M+2) and SIB-(M+3). However, this is merely an example and the structure of the common content may also include one single system information message carrying a single one or a plurality of system information blocks. System information blocks typically group elements with similar purpose (cf. background section above).

The system information which is different for different CE levels (cf. "Different Content" in FIG. 6) is also exemplified in FIG. 6. Accordingly, there are two different system information messages SI-1 and SI-2 for each of the four CE levels "zero", "low", "medium" and "high". System information message SI-1 includes two system information blocks, namely SIB-N and SIB-(N+1). In general, the system information message may also include one single SIB or more than two SIBs. The system information message SI-2 includes only one system information block denoted as SIB-(N+2) which is also merely exemplary. As can be seen from this example, system information for each of the different CE levels here has the same structure in terms of system information messages and system information blocks. Accordingly, the values of the information elements carried in the corresponding SIBs for different CE levels may be set independently, and thus may have different values. The information elements which are common for all CE levels in this example are organized independently and differently from the "Different Content" system information. In particular, the "Common Content" includes system information messages and also system information blocks different from those included in the "Different Content" system information.

However, it is noted that this is not meant to limit the present disclosure to such system information organization. Rather, some portions of the same SIB may be carried within the "Different Content" section whereas other portions of the same SIB may be carried within the "Common Content".

The structure of the system information illustrated in FIG. 6 may exist parallel to the system information to be read by a legacy wireless device, to the system information specified by the current LTE standard.

Figure 7:
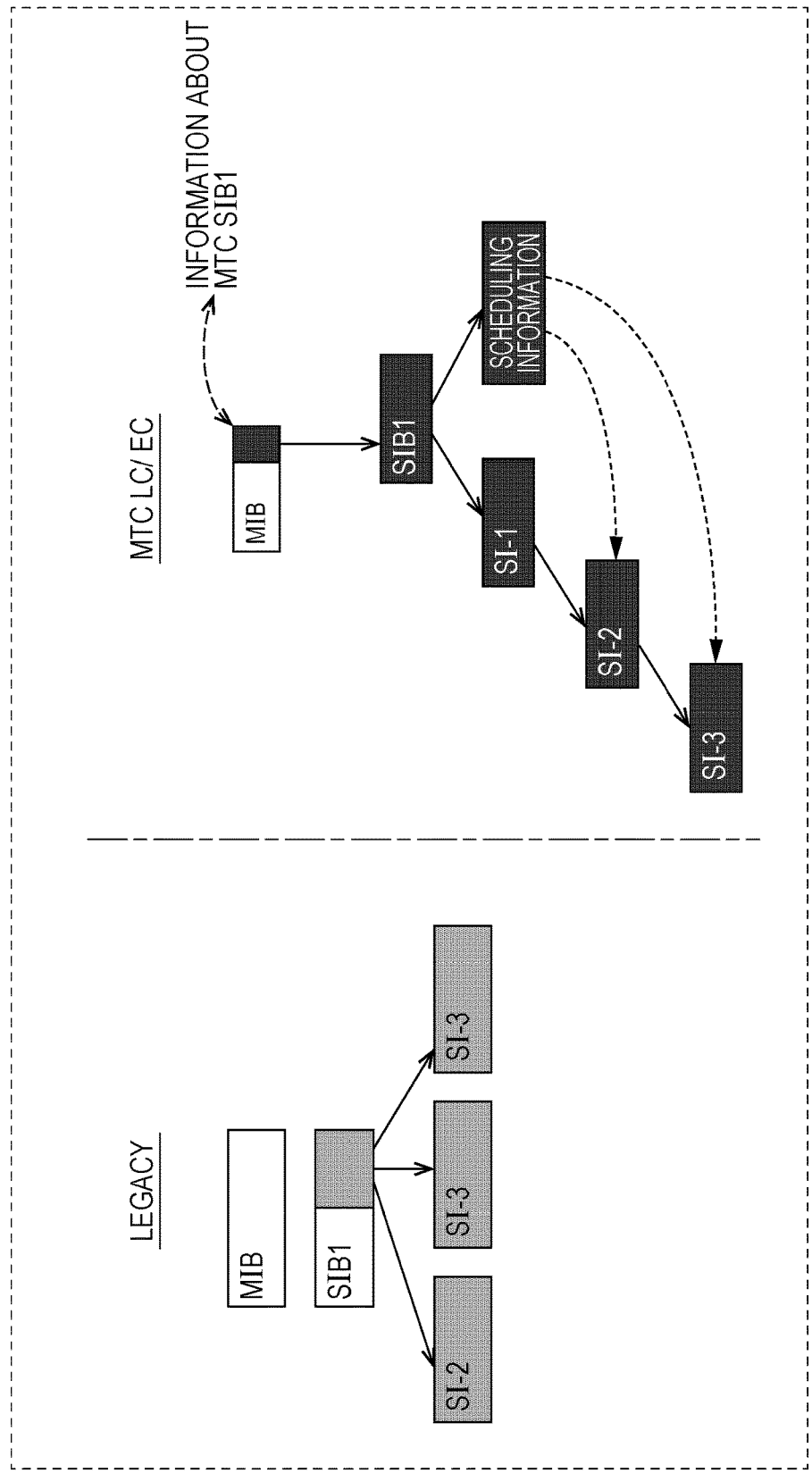
FIG. 7 is a schematic diagram illustrating comparison between the legacy system information signaling and signaling of system information for MTC.

FIG. 7 illustrates a comparison between the structure of system information currently applied by LTE and the structure of system information according to an advantages embodiment. On the left-hand side the legacy structure is shown. In particular, the most information block (MIB) is broadcasted on the physical broadcast channel. SIB1 scheduling is fixed in time domain and the UE performs blind decoding using SI-RNTI on these specific time instances (subframes) to find the frequency location of SIB1. SIB1 then includes scheduling information for system information messages SI-1, SI-2, SI-3 carrying further system information blocks.

The SystemInformationBlockType1 (SIB1) uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0. A single SI-RNTI is used to address SystemInformationBlockType1 as well as all SI messages.

The system information structure of the present embodiment which is particularly suitable for MTC LC/EC mode is shown on the right-hand side of FIG. 7. The MIB is the same as the MIB used for legacy system (on the left hand side). However, some bits which were reserved in the MIB as specified in the current LTE standard are used here to carry information about the location (within the resource grid), periodicity, frequency hopping, and/or TBS (Transport Block size) etc. of a SIB1. In this example, the SIB1 (MTC-SIB1) is specific for the MTC LC/EC and differs from the legacy SIB1 (in general, resources for SIB1). The MTC-SIB1 in this example further refers to a separate SIB including scheduling information for SIBs common for different CE levels and scheduling information for SIBs different for different CE levels. In particular, the scheduling information indicates location of system information message SI-2 and system information message SI-3. System information message SI-1 may be directly referred to from the MTC-SIB1.

However, the present disclosure is not limited to this example. For instance, SIB1 of the legacy system may also be reused instead of providing a separate MTC specific SIB1. Moreover, SIB1 (legacy or MTC specific) may also point only to the scheduling information and not to other system information messages/blocks. The scheduling information would then carry all information concerning to scheduling of system information for different CE levels. In the example above the scheduling information is a part of a separate system information block. However, the system information block may also include further information concerning the MTC and/or different CE levels. For instance, it may include the system information common for all CE levels and systemInfoValueTag for the whole System information separately for each CE level or even manysystemInfoValueTag(s), one for each functionality/procedure/SIB etc. for each CE level or for all CE levels grouped together.

Alternatively, the scheduling information may be included directly in the SIB1 (or MTC-SIB1).

The above disclosed embodiments and examples may provide various benefits. For instance, the cell support for any particular CE level is visible to a wireless device and the wireless device can also calculate its own required coverage extension. Moreover, the cell/system load is restricted to a reasonable limit with the above described structuring (grouping) of system information related to coverage enhancement. The eNB scheduler (in general the scheduler of the network node transmitting the system information) implementation and/or behavior is not complicated. Moreover, the legacy UEs (wireless devices which do not support coverage enhancement such as LTE and LTE-A devices supporting releases 8 to release 13) are not affected. The MTC device behavior in acquiring, re-acquiring upon change of levels and upon SI change notifications is clear.

Figure 8:
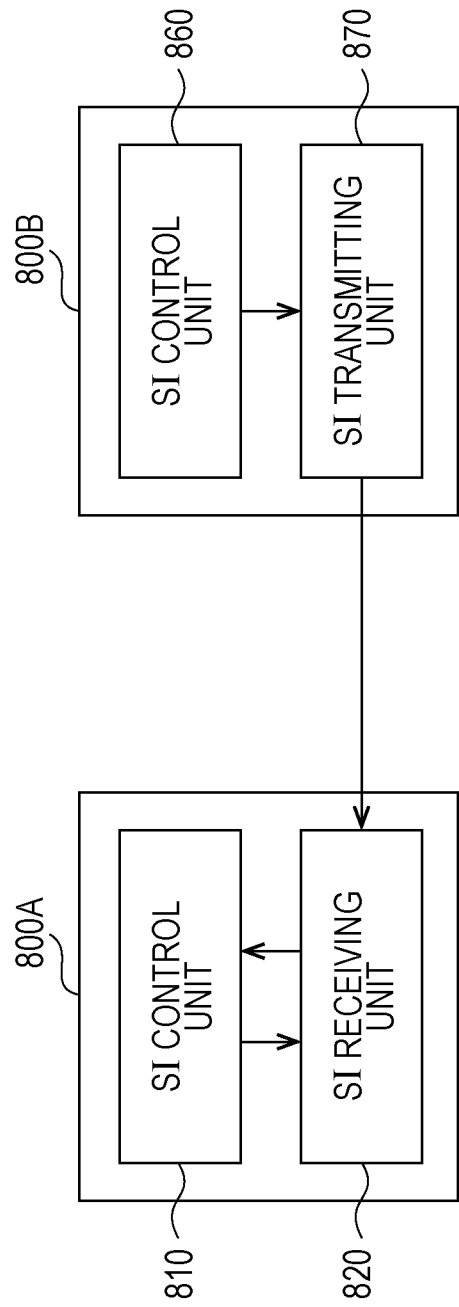
FIG. 8 is a block diagram illustrating a receiving and a transmitting apparatus.

The present disclosure provides an apparatus 800A for receiving system information in a wireless communication system supporting coverage enhancement as shown in FIG. 8.

This apparatus may be any wireless apparatus such as a user device (terminal) of any type such as mobile phone, smart phone, tablet, computer, computer card or USB connectable wireless interface, or the like.

The apparatus advantageously includes an SI receiving unit 820 that receives system information; and an SI control unit 810 that controls the SI receiving unit 820 to receive system information including a coverage enhancement level indication for indicating enhanced coverage levels supported by the wireless communication system, and to receive system information including a group of information elements common for different coverage enhancement levels and one or more groups of information elements specific for different coverage enhancement levels.

The grouping of the CE-level-specific information may be performed for the respective CE levels (or groups of CE levels). For instance, the grouping here may be performed on a system information block basis, such that a separate SIB is provided for each CE level (or for a subset of CE levels) and another separate SIB is performed for the IEs common to all CE levels. Alternatively, the grouping may be performed on an information element basis, i.e. each IE includes respective values for the corresponding CE levels. Other groupings are also possible, including mixing of the above SIB-based and IE-based approach.

For instance, the system information is transmitted in system information blocks; and the group of information elements common for different coverage enhancement levels is transmitted in a system information block different from the system information block in which the information elements specific for at least one different coverage enhancement level are transmitted.

The information elements for a first coverage enhancement level are received in a number of repetitions higher than the number of repetitions with which information elements for a second coverage enhancement level are received, wherein the first coverage enhancement level is higher than the second coverage enhancement level.

This arrangement ensures that the terminals having worse channel conditions (corresponding to higher CE level) may receive more SI repetitions in order to increase the probability of correct SI acquisition (correct decoding).

According to an embodiment, the group of information elements common for different coverage enhancement levels is transmitted with a first frequency, and the SI control unit 810 is configured to control the SI receiving unit 820 to receive versions of the group of information elements common for different coverage enhancement levels with a frequency equal to or lower than the first frequency, depending on the coverage enhancement level currently applied by the apparatus.

Thus, the terminals applying different coverage enhancement levels may read the SI with different frequency and thus, improve the tradeoff between battery power and speed of SI acquisition time. However, the present disclosure is not limited to this arrangement. Rather, each terminal may read all repetitions (versions) of SI and stop the reception as soon as the SI was decoded successfully. Other implementations are possible, for instance, the wireless devices of different CE levels may be configured to receive only certain number of the repetitions (versions).

The coverage enhancement level indication received may include at least one of:
- a list of supported coverage enhancement levels,
- the highest supported coverage enhancement level, wherein the apparatus is configured to derive the supported coverage enhancement levels as all levels smaller than or equal to the received highest supported coverage enhancement level,
- a number of values of a particular information element, wherein the apparatus is configured to derive the supported coverage enhancement levels according to the number of the values of the particular information element, and
- a single value of an information element, wherein the apparatus is configured to derive the supported coverage enhancement levels according to the single value of the information element.

Accordingly, the coverage enhancement levels supported by the network may be advertised either explicitly by broadcasting the corresponding system information in a MIB, SIB1 or other SIB) or implicitly by indicating the CE levels supported for instance by means of the number of values of a particular information element(s) or even by indicating the periodicity of M-SIB1 (higher periodicity of M-SIB1 means highest CE level supported; medium periodicity of M-SIB1 means medium CE level supported and so on) or even by associating e.g. the possible starting positions of MSIB1 to particular levels of CE support (starting position [say PRB index] of M-SIB1=X would mean CE level support high; starting position [PRB index] of M-SIB1=Y would mean CE level support medium; and so on). As an example for periodicity, say CE level high, med, low has 20, 60 and 100 as periodicity. Then when MIB indicates periodicity as 20, a UE knows that periodicities 60 and 100 are also supported i.e. CE levels med and low are also supported when CE level high is supported.

Thus, concerning the indication by a single value of an information element, this may be, for an information element indicating periodicity (frequency of occurrence). For instance, CE level high, medium, and low may have 20, 60 and 100 ms as periodicity. Then when MIB indicates periodicity as 20, a UE knows that periodicities 60 and 100 are also supported i.e. CE levels medium and low are also supported when CE level "high" is supported.

In particular, the SI control unit 810 may control the SI receiving unit 820 to receive the system information in a plurality of versions.

Here, the term versions may denote redundancy versions or any other kind of content repetitions. For instance, the SI may be encoded by a forward error coding which adds redundancy. Examples of such coding may be the Turbo codes or convolutional codes as applied by the LTE. However, any other coding is also possible such as block codes like LDPC, BCH or the like. One version of such coded SI then corresponds to a portion of the coded SI. Different portions—versions—of the coded SI may be transmitted at different times (for instance in different subframes). These portions may be individually decodable.

However, the SI versions may also be simple repetitions or a combination of redundancy versions and their repetitions. For instance, there may be four (in general K, K being an integer larger than 1) redundancy versions defined for each SI message and these four RVs are transmitted cyclically repeated a plurality of times (in general N, N being an integer larger than 1). The SI versions may be mapped to the respective subframes.

The apparatus may further include a combining unit that combines the plurality of versions received and a decoding unit that checks whether the system information after combining can be correctly decoded; and the SI control unit 810 is configured to prevent the SI receiving unit 820 from receiving further versions of the system information if the system information after combining can be correctly decoded.

The combining unit may include, for instance, a soft combiner which combines the detected bit reliabilities of the received versions/repetitions or a hard combiner which combines the detected bits. The combining may include incremental redundancy combining of different redundancy versions to one coded block which is then decoded.

Moreover, the combining unit advantageously combines the plurality of versions of system information received so far after reception of each version, and the decoding unit checks whether the system information can be correctly decoded after each combining.

After receipt of each new SI version, the combining may be performed and a decoding may be attempted. However, the newly received SI version may also be attempted to decode individually at first and only combined if it is not decodable correctly. The correctness of the decoding may be checked by means of checking the cyclic redundancy check (CRC) attached to the SI. However, other implementations are also possible without limiting the present disclosure. For instance, the decoding may be attempted not after receiving each new SI version but rather after receiving (and possibly combining) each M (M being an integer larger than 1) SI versions in order to reduce computational complexity.

According to an embodiment, the apparatus further includes a coverage enhancement level determining unit that determines own coverage enhancement level based on one of pathloss, Reference Signal Received Power, and measurements such as Reference Signal Receive Quality and that checks whether the determined own coverage enhancement level is supported by the wireless communication system based on the received coverage enhancement level indicator, wherein, if the own coverage enhancement level is supported by the wireless communication system, the SI control unit 810 controls the SI receiving unit 820 to receive system information for the own coverage enhancement level.

If the own coverage enhancement level is not supported by the current network cell, then the terminal may try to change the cell (by means of Cell reselection) or be out of the network coverage. However, other behavior may also be defined.

The SI control unit 810 may control the SI receiving unit 820 to receive scheduling information within a system information block referred to from a system information block (SIB1) of which the location is indicated in a master information block (MIB), and to receive system information for the own coverage enhancement level according to the scheduling information.

This is only an advantageous example of scheduling the SIBs in which the SI concerning the CE is conveyed. In general, the scheduling may be performed differently, for instance by directly referring to the scheduling information from the MIB or by in any other way. The scheduling information may fully specify the resources on which the CE level common and the CE level specific SI is transmitted. This has the advantage of simplicity for the terminal implementation which merely receives the SI on the resources specified in the scheduling information. However, the complete scheduling information (including time and frequency domain resources, frequency hopping, transport block size (TBS) and modulation and coding scheme (MCS) etc.) also may introduce considerable signaling overhead. Alternatively, the scheduling information may only include a subset of resource specification while other resource features are fixed. For instance, the frequency location of the SI may be fixed to the central 6 PRBs or to any other subset of frequency resources. Alternatively or in addition, the application of frequency hopping may be fixed or signaled in other, less frequent manner (in other SI) and the TBS and/or MCS may be fixed or signaled elsewhere. The time domain scheduling may include (or consist of) the specification of subframes in which the SI is to be carried. The scheduling information advantageously includes separate scheduling for the separate groupings of IEs—the CE level independent group (IEs common to all CE levels) and for the particular respective groupings specific to one or more CE levels.

For example, the coverage enhancement level indication may indicate one or more of four different coverage enhancement levels, including a zero level indicating no coverage enhancement.

However, the number four is only exemplary and may be beneficial as it requires only 2 bits of signaling and still provides distinguishing of three CE levels and no CE.

The system information for different coverage enhancement levels is grouped according to one of the following configurations:
  a first group for the zero level and a second group for the remaining three coverage enhancement levels;
  a first group for the zero level and the lowest of the four coverage enhancement levels and a second group for the remaining two coverage enhancement levels;
  a first group for the zero level and the two lower enhancement coverage levels and a second group for the highest of the four coverage enhancement levels; and
  one single group for all four coverage enhancement levels, and the SI control unit 810 controls the SI receiving unit 820 to receive the configuration currently used by the network within system information.

It is noted that the above examples have shown four CE levels, also including the zero level. However, it is noted that the zero level does not have to be included as a separate CE level. For instance the general usage of EC may be signaled or indicated implicitly in another place.

However, the zero level may mean that MTC is applied but without EC, for instance only LC mode.

The system information may be MIB, SIB1, scheduling information SIB or any other SIB in general, as described above.

The configuration may be received within a system information message further including a grouping of scheduling information indicating the location of a first system information block in which the first group is carried and the location of a second system information block in which the second group is carried, the first system information block and the second system information block being mutually different.

For example, the wireless communication system is 3GPP Long Term Evolution, LTE, or LTE advanced, LTE-A, and the system information messages including system information blocks for enhanced coverage support except for master information block are received independently of the system information for LTE or LTE-A without supporting coverage enhancement.

Moreover, the present disclosure provides an apparatus 800B as shown in FIG. 8 for transmitting system information in a wireless communication system supporting coverage enhancement.

The apparatus 800B may be, for instance a network node controlling the transmission of system information within a cell. In particular, the network node may be a base station such as a NodeB/eNodeB in UMTS and LTE (LTE-A) respectively. However, the present disclosure is not limited thereto and any other device such as relay or any node in a wireless network transmitting system information may embody the apparatus 800B.

The apparatus 800B may include an SI transmitting unit 870 that transmits system information; an SI control unit 860 that controls the SI transmitting unit 870 to transmit system information including a coverage enhancement level indication for indicating enhanced coverage levels supported by the wireless communication system, and to transmit system information including a group of information elements common for different coverage enhancement levels and information elements specific for different coverage enhancement levels grouped for respective coverage enhancement levels.

In particular, as shown in FIG. 8, the apparatus 800B may be configured to generate and transmit the system information which is scheduled, grouped, and/or structured as described above in connection with reception of the system information.

Figure 9:
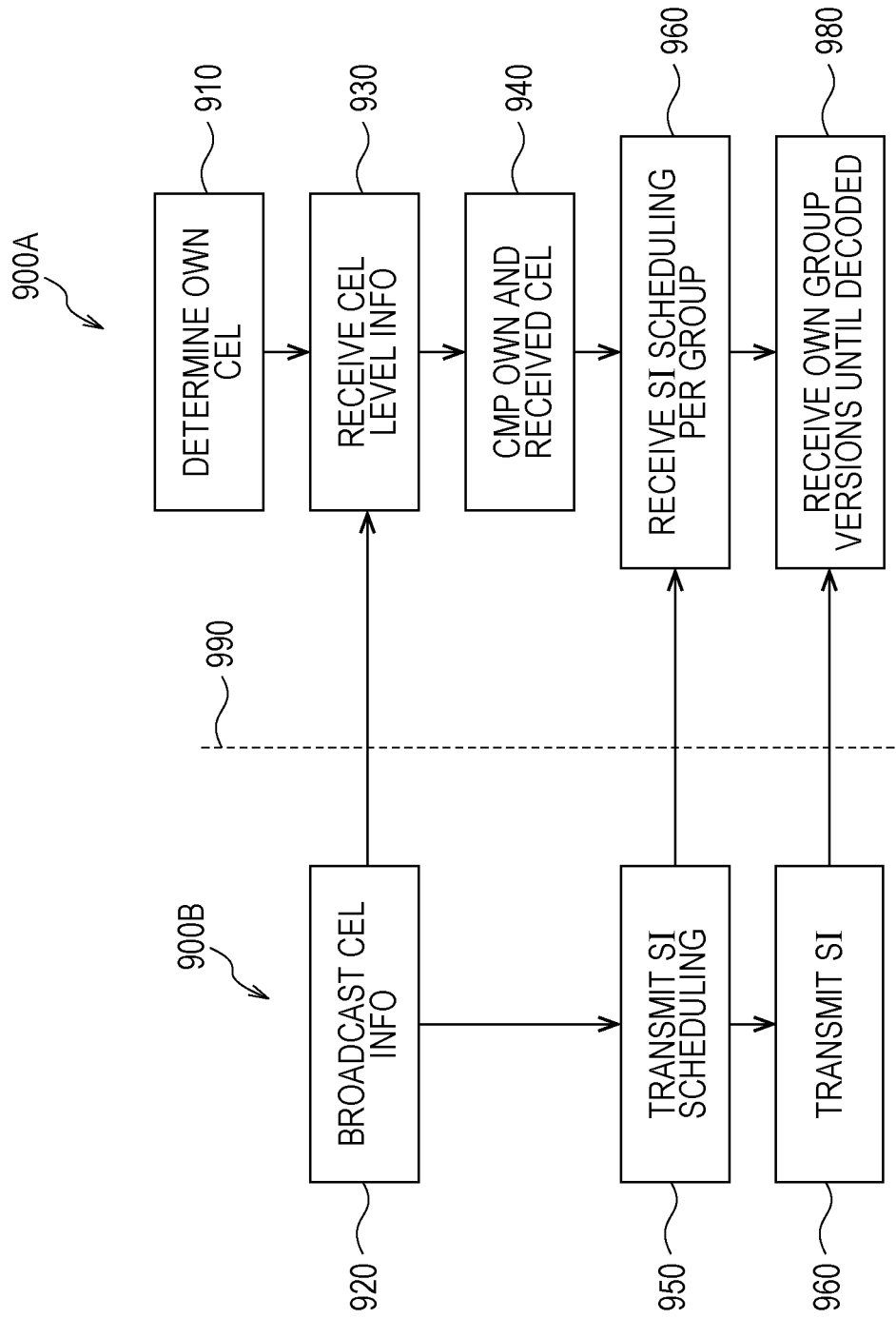
FIG. 9 is a flowchart illustrating a receiving and transmitting method.

The methods for receiving and transmitting the system information are illustrated in FIG. 9. Accordingly, the present disclosure provides a method 900A for receiving system information in a wireless communication system supporting coverage enhancement including the steps of: receiving 930 system information including a coverage enhancement level indication for indicating enhanced coverage levels supported by the wireless communication system; and receiving 980 system information including a group of information elements common for different coverage enhancement levels and information elements specific for different coverage enhancement levels grouped for respective coverage enhancement levels.

The method 900A may also include further steps already described above performed by various units of the corresponding receiving device. In particular, FIG. 9 shows step 910 of determining the own CE level (CEL) by the wireless device. The determining of the CE level may be performed based on the measured channel quality as exemplary described above. Then, the wireless device receives 930 CE levels supported by the network and in particular by the cell in which the wireless device is located (connected to). It is noted that the steps and 910 and 930 can also be executed in a reverse order. The wireless device then compares 940 the determined own CE level and the CE levels supported by the network in order to determine whether its own CE level is supported by the network. In case the own determine CE level is not supported by the network, the wireless device is out of coverage of the current cell for which the system information was analyzed. If the own CE level is supported by the network, in step 960 the wireless device receives system information scheduling information which indicates resources on which the system information concerning different CE levels is transmitted. Based on the scheduling information, in step 980 the wireless terminal receives system information concerning the own determined CE level. The transmission and reception of the system information is performed over the wireless interface 990.

Furthermore, the present disclosure provides a method 900B for transmitting system information in a wireless communication system supporting coverage enhancement including the steps of: transmitting 920 system information including a coverage enhancement level indication for indicating enhanced coverage levels supported by the wireless communication system; and transmitting 960 system information including a group of information elements common for different coverage enhancement levels and information elements specific for different coverage enhancement levels grouped for respective coverage enhancement levels.

This method is also exemplified in FIG. 9. Basically, the network node transmitting the system information performs the step 920 of broadcasting the CE level indication. Various possibilities of formatting the CE level indication are already described above with reference to the corresponding receiving apparatus.

The network node also advantageously transmits 950 scheduling information specifying on which resources the system information concerning specific CE levels is transmitted. Finally, the system information concerning specific CE levels is transmitted in step 960. The scheduling and formatting as well as grouping of the system information and the related data (scheduling information and the like) is also described above in various examples and embodiments.

In another general aspect, the techniques disclosed here feature an apparatus for transmitting system information in a wireless communication system supporting coverage enhancement comprising: a transmission unit for transmitting system information; a control unit for controlling the transmitting unit to transmit system information including a coverage enhancement level indication for indicating enhanced coverage levels supported by the wireless communication system; and to transmit system information including a group of information elements common for different coverage enhancement levels and information elements specific for different coverage enhancement levels grouped for respective coverage enhancement levels.

In another general aspect, the techniques disclosed here feature a method for receiving system information in a wireless communication system supporting coverage enhancement comprising the steps of: receiving system information including a coverage enhancement level indication for indicating enhanced coverage levels supported by the wireless communication system; and receiving system information including a group of information elements common for different coverage enhancement levels and information elements specific for different coverage enhancement levels grouped for respective coverage enhancement levels.

In one general aspect, the techniques disclosed here feature a method for transmitting system information in a wireless communication system supporting coverage enhancement comprising: transmitting system information including a coverage enhancement level indication for indicating enhanced coverage levels supported by the wireless communication system; and transmitting system information including a group of information elements common for different coverage enhancement levels and information elements specific for different coverage enhancement levels grouped for respective coverage enhancement levels.

In accordance with another embodiment, a non-transitory computer-readable recording medium storing a computer-readable program code embodied thereon is provided, the program code being adapted to carry out the present disclosure.

Other exemplary embodiments relate to the implementation of the above described various embodiments using hardware and software. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. They may include a data input and output coupled thereto. The various embodiments may also be performed or embodied by a combination of these devices.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

Summarizing, The present disclosure relates to transmitting and receiving of system information which includes controlling the transmission and/or the reception to transmit and/or receive system information including a coverage enhancement level indication for indicating enhanced coverage levels supported by the wireless communication system and to transmit and/or receive system information including a group of information elements common for different coverage enhancement levels and information elements specific for different coverage enhancement levels grouped for respective coverage enhancement levels.

What is claimed is:

1. An apparatus for receiving system information in a wireless communication system supporting coverage enhancement, comprising:
   a receiver, which, in operation, receives system information;
   control circuitry, which, in operation, controls the receiver to receive the system information including a coverage enhancement level indication for indicating enhanced coverage levels supported by the wireless communication system and including a group of information elements common for different coverage enhancement levels and one or more groups of information elements specific for different coverage enhancement levels, and controls the receiver to receive the system information in a plurality of versions;
   soft-combine circuitry, which, in operation, soft-combines the plurality of versions of the system information received so far after reception of each version, without processing further versions of the system information if the system information after soft-combining can be correctly decoded; and
   a decoder, which, in operation, checks whether the system information after soft-combining can be correctly decoded after each soft-combining.

2. The apparatus according to claim 1, wherein
   the system information is transmitted in system information blocks, and
   the group of information elements common for different coverage enhancement levels is transmitted in a system information block different from the system information block in which the information elements specific for at least one different coverage enhancement level are transmitted.

3. The apparatus according to claim 1, wherein
   the group of information elements common for different coverage enhancement levels is transmitted with a first frequency, and
   the control circuitry, in operation, controls the receiver to receive versions of the group of information elements common for different coverage enhancement levels with a frequency equal to or lower than the first frequency, depending on the coverage enhancement level currently applied by the apparatus.

4. The apparatus according to claim 1, wherein the coverage enhancement level indication received comprises at least one of:
   a list of supported coverage enhancement levels,
   a highest supported coverage enhancement level, wherein the apparatus is configured to derive the supported coverage enhancement levels as all levels smaller than or equal to the received highest supported coverage enhancement level,
   a number of values of a particular information element, and
   a single value of an information element, wherein the apparatus is configured to derive the supported coverage enhancement levels according to the number of the values of the particular information element or from the single value of an information element.

5. The apparatus according claim 1, comprising:
   coverage enhancement level determination circuitry, which, in operation, determines an own coverage enhancement level based on one of pathloss, Reference Signal Received Power, and measurements including Reference Signal Receive Quality, and checks whether the determined own coverage enhancement level is supported by the wireless communication system based on the received coverage enhancement level indication, wherein, if the own coverage enhancement level is supported by the wireless communication system, the control circuitry controls the receiver to receive the system information for the own coverage enhancement level.

6. The apparatus according to claim 5, wherein the control circuitry, in operation, controls the receiver to receive scheduling information within a system information block referred to from a system information block 1 (SIB 1) of which a location is indicated in a master information block (MIB), and to receive the system information for the own coverage enhancement level according to the scheduling information.

7. The apparatus according to claim 1, wherein the coverage enhancement level indication indicates one or more of four different coverage enhancement levels, including a zero level indicating no coverage enhancement, the system information for different coverage enhancement levels is grouped according to one of the following configurations:

a first group for the zero level and a second group for the remaining three coverage enhancement levels;

a first group for the zero level and the lowest of the four coverage enhancement levels and a second group for the remaining two coverage enhancement levels;

a first group for the zero level and the two lower enhancement coverage levels and a second group for the highest of the four coverage enhancement levels; and one single group for all four coverage enhancement levels, and the control circuitry, in operation, controls the receiver to receive the configuration currently used by the network within the system information.

8. The apparatus according to claim 7, wherein the configuration is received within a system information message, the system information message including a grouping of scheduling information indicating a location of a first system information block in which the first group is carried and a location of a second system information block in which the second group is carried, the first system information block and the second system information block being mutually different.

9. The apparatus according to claim 1, wherein the wireless communication system is 3GPP Long Term Evolution (LTE), or LTE advanced (LTE-A), and system information messages including system information blocks for enhanced coverage support except for a master information block are received independently of the system information for LTE or LTE-A without supporting coverage enhancement.

10. A method for receiving system information in a wireless communication system supporting coverage enhancement, comprising:

receiving system information including a coverage enhancement level indication for indicating enhanced coverage levels supported by the wireless communication system and including a group of information elements common for different coverage enhancement levels and one or more groups of information elements specific for different coverage enhancement levels;

receiving the system information in a plurality of versions;

performing soft-combining of the plurality of versions of the received system information received so far after reception of each version, without processing further versions of the system information if the system information after soft-combining can be correctly decoded; and checking whether the system information after soft-combining can be correctly decoded after each soft-combining.

* * * * *